(12) United States Patent
Alspach et al.

(10) Patent No.: US 11,993,498 B2
(45) Date of Patent: May 28, 2024

(54) STRUCTURES AND SENSOR ASSEMBLIES HAVING ENGAGEMENT STRUCTURES FOR SECURING A COMPLIANT SUBSTRATE ASSEMBLY

(71) Applicant: Toyota Research Institute, Inc., Los Altos, CA (US)

(72) Inventors: Alexander Alspach, Somerville, MA (US); Andrew M. Beaulieu, Somerville, MA (US); Aimee S. Goncalves, Kingston, MA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 66 days.

(21) Appl. No.: 17/828,987

(22) Filed: May 31, 2022

(65) Prior Publication Data

US 2023/0138629 A1 May 4, 2023

Related U.S. Application Data

(60) Provisional application No. 63/272,824, filed on Oct. 28, 2021.

(51) Int. Cl.
*B25J 13/08* (2006.01)
*B25J 5/00* (2006.01)
(Continued)

(52) U.S. Cl.
CPC ............ *B66F 9/18* (2013.01); *B25J 5/007* (2013.01); *B25J 9/0009* (2013.01); *B25J 9/06* (2013.01);
(Continued)

(58) Field of Classification Search
CPC ............ G01L 5/009; G01L 5/226–228; B25J 13/082; B25J 19/0075
See application file for complete search history.

(56) References Cited

U.S. PATENT DOCUMENTS

| 4,393,728 A * | 7/1983 | Larson ............... B25J 9/06 623/24 |
| 5,083,498 A * | 1/1992 | Sato ............... F15B 15/103 92/92 |

(Continued)

FOREIGN PATENT DOCUMENTS

| CN | 110539333 A | 12/2019 |
| CN | 108891562 B | 6/2020 |

(Continued)

*Primary Examiner* — Tran M. Tran
(74) *Attorney, Agent, or Firm* — DINSMORE & SHOHL LLP

(57) ABSTRACT

Structures and sensor assemblies having engagement structures for securing a compliant substrate assembly are disclosed. In one embodiment, a sensor assembly includes a compliant substrate assembly having a base layer, and a deformable layer heat-sealed to the base layer such that the base layer and the deformable layer define at least one inflatable chamber. The sensor assembly further includes a first member proximate to a first edge of the compliant substrate assembly, a second member proximate to a second edge of the compliant substrate assembly, wherein the second edge is opposite the first edge, and at least one pressure sensor fluidly coupled to the at least one inflatable chamber and operable to produce a signal indicative of a pressure within the at least one inflatable chamber.

18 Claims, 32 Drawing Sheets

(51) Int. Cl.
*B25J 9/00* (2006.01)
*B25J 9/06* (2006.01)
*B25J 9/14* (2006.01)
*B25J 9/16* (2006.01)
*B25J 15/00* (2006.01)
*B25J 19/00* (2006.01)
*B66F 9/075* (2006.01)
*B66F 9/18* (2006.01)
*G01L 1/04* (2006.01)
*G01L 1/12* (2006.01)
*G01L 1/22* (2006.01)
*G01L 5/00* (2006.01)
*G01L 7/08* (2006.01)
*G01L 9/00* (2006.01)
*G01L 5/22* (2006.01)

(52) U.S. Cl.
CPC .......... *B25J 9/144* (2013.01); *B25J 9/1612* (2013.01); *B25J 9/1682* (2013.01); *B25J 13/084* (2013.01); *B25J 13/085* (2013.01); *B25J 15/0033* (2013.01); *B25J 19/007* (2013.01); *B25J 19/0075* (2013.01); *B66F 9/0759* (2013.01); *G01L 1/04* (2013.01); *G01L 1/046* (2013.01); *G01L 1/127* (2013.01); *G01L 1/22* (2013.01); *G01L 5/0028* (2013.01); *G01L 5/0061* (2013.01); *G01L 7/082* (2013.01); *G01L 9/0055* (2013.01); *G01L 9/0064* (2013.01); *B25J 5/00* (2013.01); *B25J 9/0087* (2013.01); *G01L 5/226* (2013.01)

(56) References Cited

U.S. PATENT DOCUMENTS

| | | | | |
|---|---|---|---|---|
| 5,662,587 A * | 9/1997 | Grundfest | ............ | A61B 1/0051 600/116 |
| 6,082,290 A * | 7/2000 | Conlin | ............ | B25J 17/025 901/49 |
| 6,543,307 B2 * | 4/2003 | Ambrose | ............ | B25J 19/0025 901/49 |
| 7,641,562 B2 * | 1/2010 | Nakamura | ............ | F16D 3/845 403/381 |
| 8,414,246 B2 * | 4/2013 | Tobey | ............ | B25J 13/084 901/1 |
| 8,568,642 B2 * | 10/2013 | Jackson | ............ | B29C 39/10 901/50 |
| 8,740,881 B2 * | 6/2014 | Ortmaier | ............ | A61B 46/10 606/1 |
| 8,936,249 B2 * | 1/2015 | Swensen | ............ | F16J 15/0893 277/645 |
| 9,021,884 B2 * | 5/2015 | Trahan | ............ | B01J 13/00 73/715 |
| 9,427,876 B2 * | 8/2016 | Mozeika | ............ | B25J 5/005 |
| 9,506,455 B2 * | 11/2016 | Mazzeo | ............ | B25J 9/1075 |
| 9,821,475 B1 * | 11/2017 | Lynn | ............ | F24S 50/20 |
| 9,908,243 B2 * | 3/2018 | Ziv-Av | ............ | B25J 9/142 |
| 10,233,910 B2 * | 3/2019 | Mazzeo | ............ | B25J 9/1075 |
| 10,286,565 B1 * | 5/2019 | Swiercz | ............ | B25J 15/08 |
| 10,562,180 B2 * | 2/2020 | Telleria | ............ | F16J 3/04 |
| 10,605,365 B1 * | 3/2020 | Griffith | ............ | F24S 23/74 |
| 10,653,538 B2 * | 5/2020 | Wijesundara | ............ | A61F 2/70 |
| 10,661,454 B2 * | 5/2020 | Motokado | ............ | B25J 19/0075 |
| 10,788,058 B2 * | 9/2020 | Galloway | ............ | A61B 34/70 |
| 10,816,417 B2 * | 10/2020 | Taniguchi | ............ | G01L 1/205 |
| 10,828,791 B2 * | 11/2020 | Fujita | ............ | B25J 19/0075 |
| 10,875,197 B2 * | 12/2020 | Lynn | ............ | F24S 50/20 |
| 11,007,638 B2 * | 5/2021 | Cobb | ............ | B25J 9/026 |
| 11,363,967 B2 * | 6/2022 | Moromugi | ............ | A61B 5/22 |
| 11,446,830 B2 * | 9/2022 | Joesten | ............ | F16L 3/015 |
| 11,572,949 B1 * | 2/2023 | Kim | ............ | F16J 3/04 |
| 11,577,411 B2 * | 2/2023 | Ootani | ............ | B25J 17/00 |
| 11,642,799 B2 * | 5/2023 | Hanlon, Jr. | ............ | B25J 19/0083 118/504 |
| 11,673,268 B2 * | 6/2023 | Johnson | ............ | B25J 9/1674 74/490.01 |
| 11,707,855 B2 * | 7/2023 | Tanaka | ............ | B25J 19/021 150/154 |
| 2002/0108491 A1 * | 8/2002 | Stahn | ............ | F01B 19/04 92/92 |
| 2014/0090506 A1 * | 4/2014 | Tobey | ............ | B25J 19/0029 74/490.01 |
| 2017/0072573 A1 * | 3/2017 | Motokado | ............ | B25J 17/0283 |
| 2019/0321989 A1 | 10/2019 | Anderson et al. | | |
| 2020/0171669 A1 | 6/2020 | Jackson et al. | | |
| 2022/0047444 A1 * | 2/2022 | Walsh | ............ | B25J 9/142 |
| 2022/0219339 A1 * | 7/2022 | Lessing | ............ | B25J 15/10 |
| 2024/0017401 A1 * | 1/2024 | Zhang | ............ | B25J 9/142 |

FOREIGN PATENT DOCUMENTS

| | | | |
|---|---|---|---|
| JP | 2003117254 A | 4/2003 | |
| WO | WO-2010060561 A1 * | 6/2010 | ......... B25J 19/0075 |

* cited by examiner

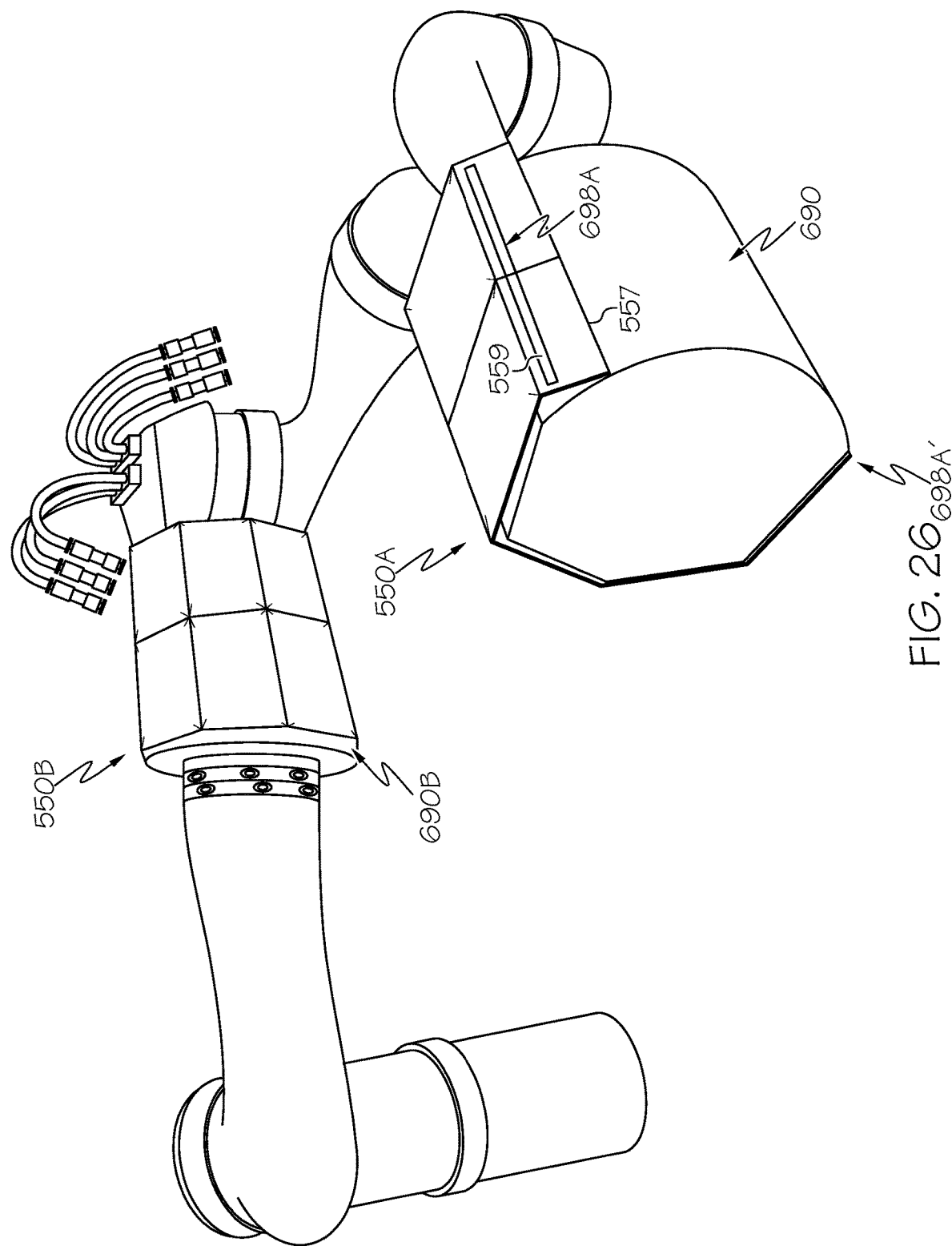

STRUCTURES AND SENSOR ASSEMBLIES HAVING ENGAGEMENT STRUCTURES FOR SECURING A COMPLIANT SUBSTRATE ASSEMBLY

CROSS-REFERENCE TO RELATED APPLICATIONS

The present application claims priority to U.S. Provisional Patent Application 63/272,824 filed on Oct. 28, 2021 and entitled "Soft Tactile-sensing Upper-body Robot for Large Object Manipulation and Physical Human Interaction," which is hereby incorporated by reference in its entirety.

TECHNICAL FIELD

The present specification generally relates to sensors and, more particularly, to structures and sensor assemblies having engagement structures for securing a compliant substrate assembly.

BACKGROUND

There are many problems that should be solved before robust robotic manipulation finds its way into our homes and daily lives. Many avenues of manipulation research rely on gripper-only grasps and interactions. While many objects are designed to be held, grasped, or used with our hands, humans manipulate larger objects using their whole bodies on a daily basis with natural, contact-rich actions. Arms, chests, and other areas of the body are frequently used to carry and stabilize large or heavy objects, piles of items, or delicate items that require a gentle distribution of pressure. Research has shown that older adults need and want assistance with lifting and carrying large and heavy objects; a type of assistance that may allow them to live independently longer. Co-developing effective hardware and control strategies for these kinds of whole-body manipulation tasks greatly expands the capabilities of robots, especially for assisting people in their homes.

Whole-body manipulation is a challenge that requires innovative solutions in both hardware and control. Accordingly, a need exists for alternative robotic hardware and control methods for whole body object manipulation.

SUMMARY

In one embodiment, a sensor assembly includes a compliant substrate assembly having a base layer, and a deformable layer heat-sealed to the base layer such that the base layer and the deformable layer define at least one inflatable chamber. The sensor assembly further includes a first member proximate to a first edge of the compliant substrate assembly, a second member proximate to a second edge of the compliant substrate assembly, wherein the second edge is opposite the first edge, and at least one pressure sensor fluidly coupled to the at least one inflatable chamber and operable to produce a signal indicative of a pressure within the at least one inflatable chamber.

In another embodiment, a structure for receiving a compliant substrate assembly includes an outer surface, a first set of engagement features extending from a first location of the outer surface, wherein the first set of engagement features are configured to receive a first member of the compliant substrate assembly, and a second set of engagement features extending from a second location of the outer surface that is offset from the first location by a distance, wherein the second set of engagement features are configured to receive a second member of the compliant substrate assembly.

In yet another embodiment, a sensor assembly includes a base structure including an outer surface, a first set of engagement features extending from a first location of the outer surface, and a second set of engagement features extending from a second location of the outer surface that is offset from the first location by a distance. The sensor assembly further includes a compliant substrate assembly including a base layer, a deformable layer heat-sealed to the base layer such that the base layer and the deformable layer define at least one inflatable chamber, a first member proximate to a first edge of the compliant substrate assembly, wherein the first member is held by the first set of engagement features, and a second member proximate to a second edge of the compliant substrate assembly, wherein the second edge is opposite the first edge and the second member is held by the second set of engagement features such that the compliant substrate assembly is stretched over at least a portion of the base structure. The sensor assembly further includes at least one pressure sensor fluidly coupled to the at least one inflatable chamber and operable to produce a signal indicative of a pressure within the at least one inflatable chamber.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 26 schematically depicts soft sensor assemblies disposed on the rigid segments of the robot depicted by FIG. 25.

DETAILED DESCRIPTION

Figure 1:
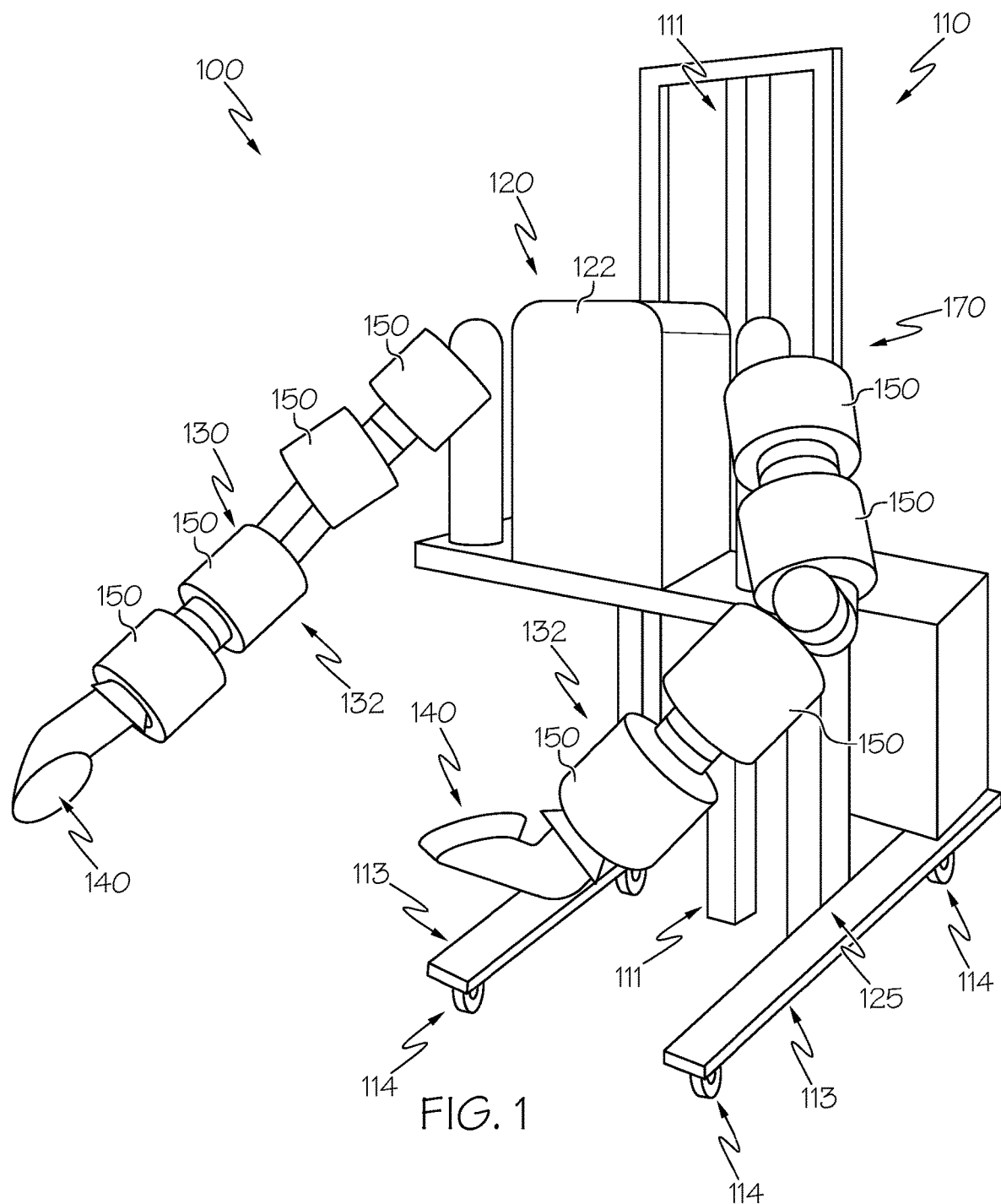
FIG. 1 schematically depicts a perspective view of an example robot according to one or more embodiments described and illustrated herein.

Referring generally to the appended figures, embodiments of the present disclosure are directed to structures and sensor devices having engagement features that are used to secure a compliant substrate assembly, such as a compliant substrate assembly that forms a part of a compliant sensor.

Unsurprisingly, older adults have difficulty with lifting and carrying large, bulky and/or heavy objects; "heavy" can be quantified as 10 lbs/5 kg as defined by PROMIS® or as "groceries" in the SF-36 Physical Function. As people age, they experience a decrease in their mobility and stability, which are key to being able to lift and carry these objects. Older adults are reluctant to accept or ask for help from a person as relying on someone else (e.g., familial caregiver, home healthaide) can decreases their sense of independence. Some older adults even discontinue the use or purchase of large, bulky, or heavy objects, which maintains their independence with a slightly reduced quality of life. Some older adults are open to the idea of robotic technology physically assisting them, especially in Japan where the ratio of older adults to young adults is 1:2.

When it comes to maintaining contact and regulating object state during grasping and manipulation, the present inventors have found that incorporating under-actuated mechanisms, joint and surface compliance, and friction offers tremendous gains in manipulation robustness. Effectively using compliant contacts all over the body is demonstrated by pressure-based feedback informed grasping of unmodeled objects. Inspired by these ideas, a gripper known as a soft bubble gripper, incorporates highly compliant tactile sensing fingers and not only maintains passively stable grasps but leverages multi-modal sensing to detect contact and manipuland state. The soft bubble gripper is described in U.S. Pat. No. 10,668,627, which is hereby incorporated by reference in its entirety.

In embodiments of the present disclosure, hard robots are equipped with durable, highly compliant, tactile sensing surfaces to enable more capable, contact-rich manipulation with minimal reliance on advanced control strategies. Embodiments also provide grasping methodologies that take advantage of softness and tactile sensing for whole-body grasping and lifting, object manipulation, and contact-rich physical human-robot interaction. Contact-rich, whole arm manipulation of objects includes challenges, such as accounting for the resulting closed-kinematic chains of multiple arms making and maintaining contact with a target geometry, enumerating and maintaining rich contact (more than two independent contact regions) with the target object, accounting for the surface frictional and compliance properties of the contact, and observing the state of the manipuland and the contact area, among others.

Various tactile sensing skins that monitor contact with objects that have been developed for both robot grippers and for the entire body of the robot are disclosed. This potentially enables whole-body physical interaction with humans and the environment, and is a promising solution for multi-contact control, as evidenced by results on monitoring contact patch geometries and in developing manipulation primitives.

Embodiments provide for an approach for augmenting off-the-shelf hard robot platforms with surface compliance and tactile sensing. With a strong focus on exploiting mechanical intelligence, embodiments enable robust and effective whole-body manipulation for large, unmodeled domestic objects with comparatively simpler tactile feedback-based control strategies.

Various embodiments for structures and sensors having engagement features for securing a compliant substrate assembly, such as a compliant substrate assembly used in a compliant sensor used for tactile sensing, are described in detail below.

Figure 2:
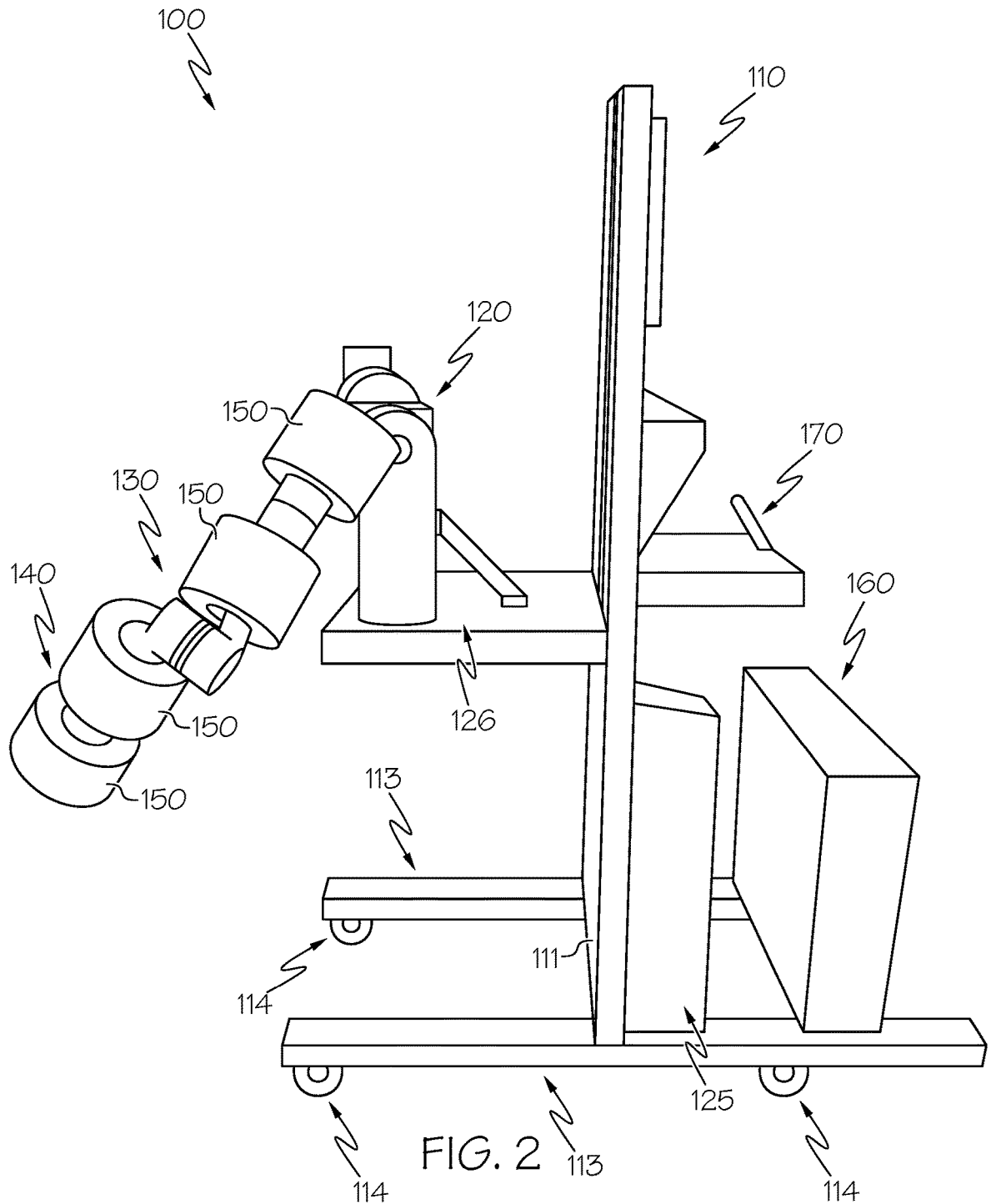
FIG. 2 schematically depicts a side view of the robot illustrated by FIG. 1 according to one or more embodiments described and illustrated herein.
Figure 3:
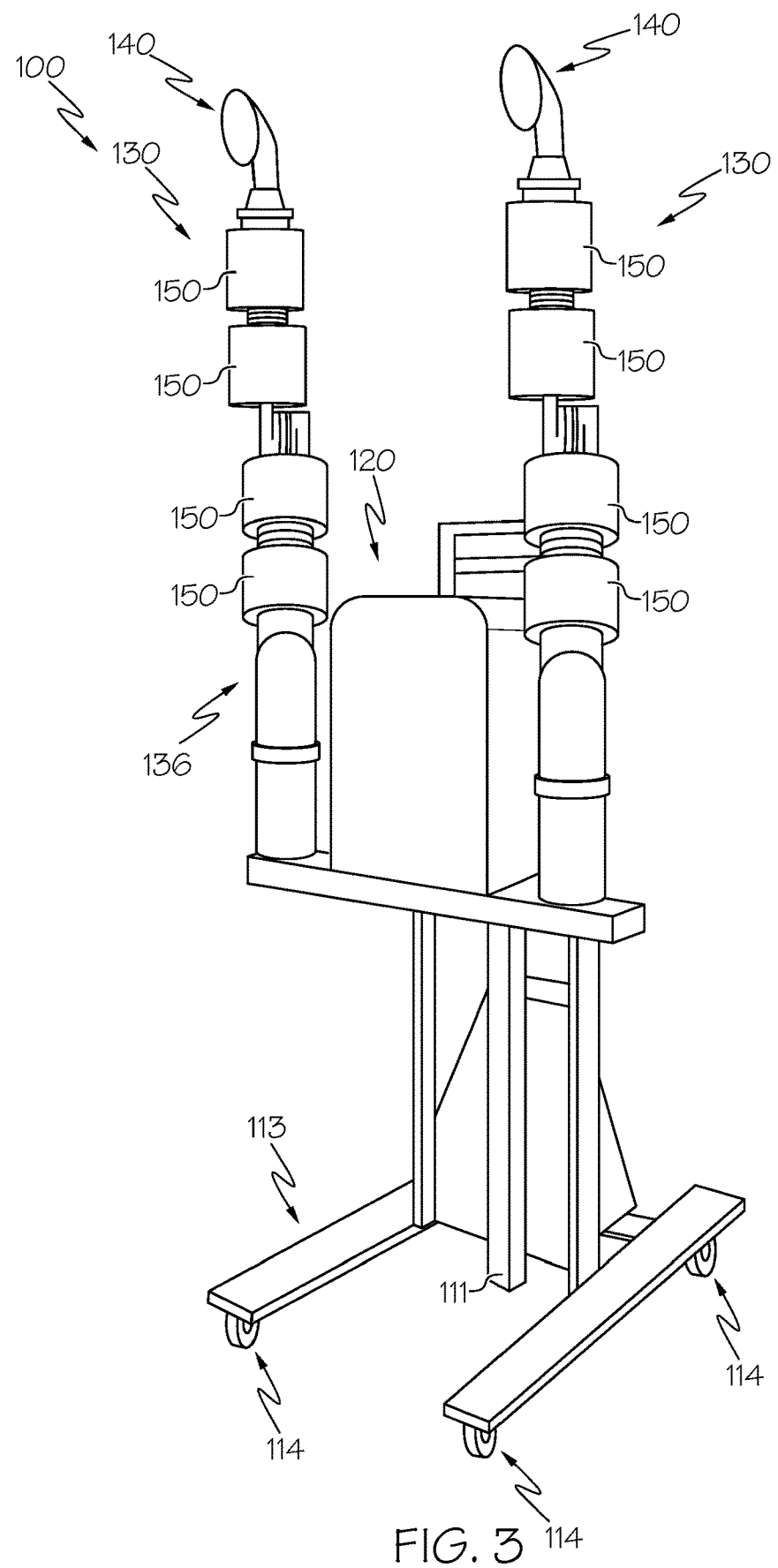
FIG. 3 schematically depicts a perspective view of the robot illustrated by FIG. 1 with its arms raised according to one or more embodiments described and illustrated herein.
Figure 4:
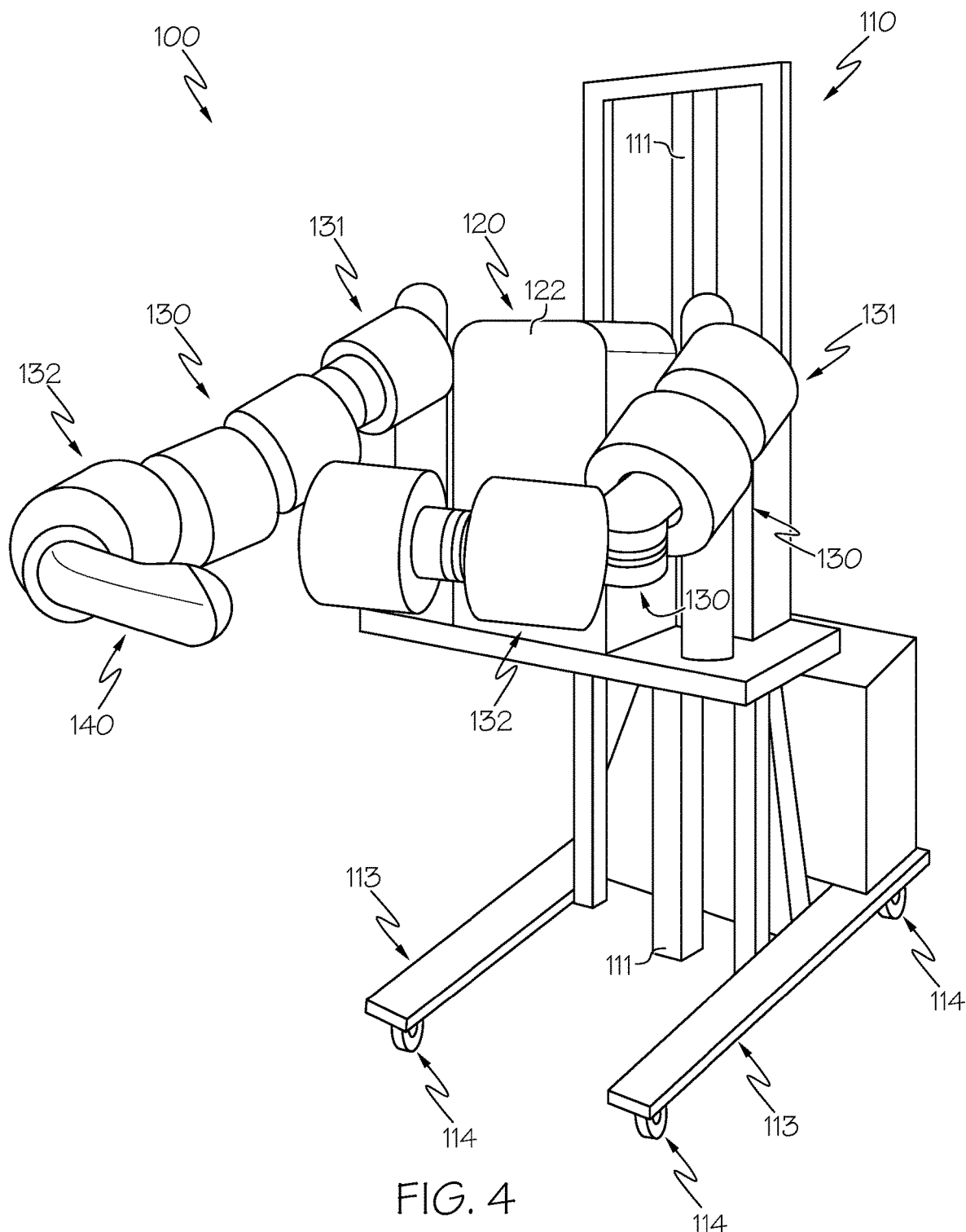
FIG. 4 schematically depicts a perspective view of the robot illustrated by FIG. 1 with its arms in a grasping position according to one or more embodiments described and illustrated herein.

Referring now to FIGS. 1-4, a non-limiting example robot 100 capable of lifting large, heavy objects by full-body, contact rich manipulation is illustrated. FIG. 1 is a front perspective view of the robot 100. FIG. 2 is a side view of the robot. FIG. 3 is a front perspective view of the robot 100 with its arms 130 raised, and FIG. 4 is a front perspective view with the arms 130 of the robot in a grasping position. It should be understood that embodiments of the present disclosure are not limited by the robot 100 illustrated by FIGS. 1-4 and that other configurations are also possible.

Generally, the robot 100 is configured as a soft, bimanual upper-body platform for large object manipulation. The robot 100 comprises a rail system 110, a base (which is defined by base members 113), a body structure 120 coupled to the rail system 110, and two arms 130 coupled to the body structure 120. As described in more detail below, the body structure 120 acts as the "chest" of the robot 100 in a similar manner as a chest of a human, which can be used for supporting large objects.

The rail system 110 includes a vertical rail 111 that extends in a system direction (e.g., a system vertical direction) on which the body structure 120 and the two arms 130 may traverse to be raised and lowered. The robot 100 further includes a lift actuator 125 (FIG. 2) that is operable to raise and lower the body structure 120 and thus the two arms 130 on the vertical rail 111. The lift actuator 125 may be any actuator capable of raising and lowering the body structure 120. Non-limiting examples of the lift actuator 125 include a linear motor and a rack and pinion linear actuator. In other embodiments, the lift actuator 125 may be manual such that a human operator may raise and lower the body structure 120 on the vertical rail 111.

The vertical rail 111 and lift actuator 125 allows for the adjustment of the body structure 120 to a specific grasping height. The base of the body structure 120 can travel vertically from the floor to a maximum height (e.g., 140 cm). The body structure 120 and the lift actuator 125 sit on the base members 113, which have passive casters 114. The base members 113 may also support a control computer and other electronics. With a power and networking bundle running off the platform, the robot 100 can be wheeled around to transfer grasped objects from one location to another. For example, the robot 100 may include handlebars 170 that may be grasped by the user to push and pull the robot in the operating environment. Thus, embodiments provide a robot 100 defining a mobile manipulation platform, either wheeled or legged, without distracting development focus from the core manipulation goals being explored. Further, the human element prevents a reliance on ground truth knowledge of the manipuland's state, forcing an embrace of tactile-driven feedback control.

Although the illustrated robot 100 is shown as having passive casters 114, it should be understood that embodiments described herein may have motorized wheels, tracks or other components configured to either remotely control the robot 100 or provide for an autonomous robot 100 that may maneuver an environment autonomously.

The robot 100 may also include a cabinet 160 to house computing devices, sensors, and other electronic components.

The two arms 130 and the body structure 120 are mounted in-line on the vertical rail 111 so that the shoulder width of the robot 100 can be adjusted at any time. In the illustrated embodiment, the bottom of the body structure 120 aligns with the base of the arms. The configuration of the arms 130 and the body structure 120 relative to one another, particularly the shoulder angles, impacts the whole-body manipulation workspace.

Figure 5:
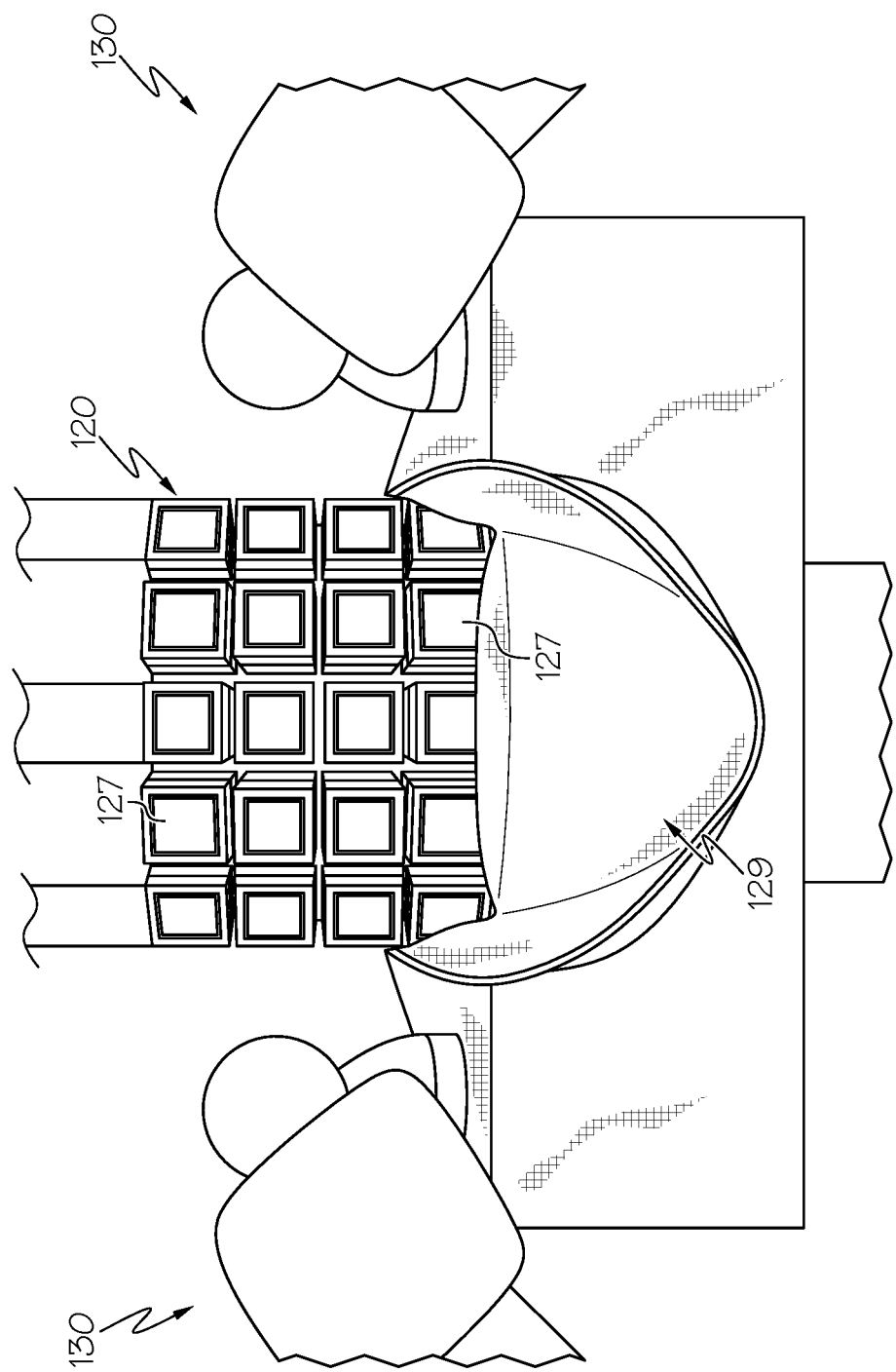
FIG. 5 schematically depicts a front view of a body structure of the robot illustrated by FIG. 1 having a cover removed according to one or more embodiments described and illustrated herein.

Referring now to FIG. 5, a front view of the body structure 120 of the example robot 100 of FIGS. 1-4 is schematically illustrated. The example body structure 120 comprises an array of flexible tactile sensors 127 that is optionally covered by a cover 129. The cover 129 may be fabricated from a friction material that increases the coefficient of friction between the body structure 120 and an object over the coefficient of friction between the array of flexible tactile sensors 127 and the same object. The cover 129 may be fabricated from a durable material such that it protects the array of flexible tactile sensors 127.

As a non-limiting example, the cover 129 may be a neoprene cover striped in high-friction tape (e.g., 3M TB641 manufactured by 3M). The neoprene material creates a smooth, uniform surface over the entire array of flexible tactile sensors 127, providing a protective layer for the flexible tactile sensors 127 and bridging gaps between the individual flexible tactile sensors 127. Meanwhile, the friction tape provides a high friction surface for objects to interface with during manipulation, thereby reducing the load carried by the arms 130 during a grasp.

Each flexible tactile sensor 127 of the array of flexible tactile sensors 127 is operable to produce a signal that is determinative of a magnitude and a direction of a force applied to the flexible tactile sensor 127 (i.e., a directional force vector). The flexible tactile sensors 127 are "flexible" in that they are capable of being deformed when a force is applied thereto. As each individual flexible tactile sensor provides an individual directional force vector when an object is pressed against the body structure 120, the geometric shape and/or pose of the object may be determined. For example, a trained model may be utilized to receive the individual directional force vectors and output a geometric shape and pose of an object pressed against the body structure 120. The data from the array of flexible tactile sensors 127 may be used to manipulate objects by using the arms 130 to press an object, such as a hamper 199, against the body structure 120.

Figure 6A:
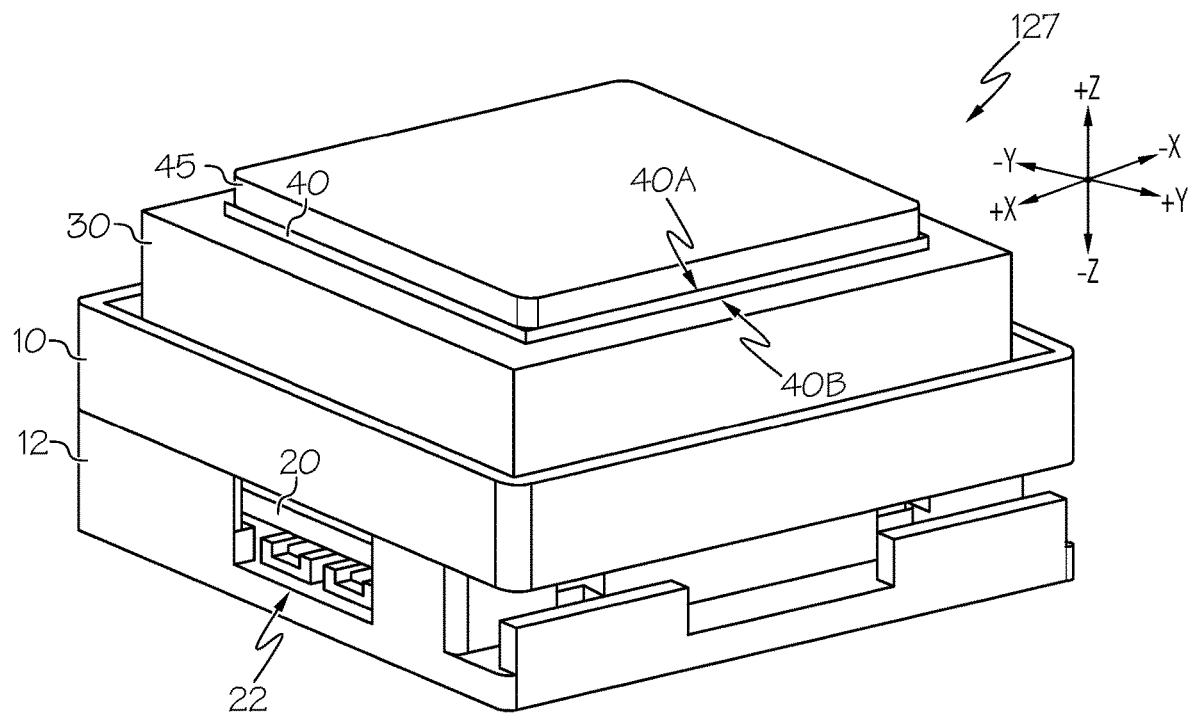
FIG. 6A schematically depicts a perspective view of an illustrative flexible tactile sensor according to one or more embodiments described and illustrated herein.

Turning to FIG. 6A, a perspective view of an illustrative flexible tactile sensor 127 according to one or more embodiments is depicted. It should be understood that embodiments are not limited by the shape and configuration of the example flexible tactile sensor 127 shown in FIG. 6A. Some embodiments of the flexible tactile sensor 127 include a housing having an upper structure 10 coupled to a lower structure 12 forming a cavity therebetween. A print circuit board (PCB) 20 is positioned within the cavity of the housing. The PCB 20, as described in more detail herein, may include a plurality of coils 25 and/or other electronic components for enabling the sensing functionality of the flexible tactile sensor 127. The flexible tactile sensor 127 further includes a pliable material 30 coupled directly to the plurality of coils 25 or to the upper structure 10 of the housing including the PCB 20. The pliable material 30 may be any material that is capable of elastically deforming under an applied force. That is, the pliable material 30 may temporarily deform and then return to an initial form when applied contact forces are removed. The pliable material 30 may be made up of one or more materials or may be a mechanical structure having members that are capable of flexing, folding, bending or the like under a contact force then returning to an initial state without permanent deformation. An example mechanical structure type of pliable material 30 is depicted and described herein with reference to FIG. 6E.

Still referring to FIG. 6A, the pliable material 30 is further coupled to a conductive target 40. The conductive target 40 is a metal plate or similar material that is spaced apart from the plurality of coils 25 by the pliable material 30. The conductive target 40 may be a metal plate or composite material having a conductive layer that interacts with the magnetic fields generated by the plurality of coils 25. The conductive target has a thickness that is greater than the skin depth of the electric field created in response to the electromagnetic field generated by the plurality of coils 25. This is to ensure that the sensors are responding to the conductive target 40 and the electromagnetic field is not effectively going through the conductive target 40 and responding to conductive items beyond the conductive target 40.

The conductive target 40 has a first surface 40A and a second surface 40B. In embodiments, the surface area of at least the second surface 40B of the conductive target 40 which is oriented to face the plurality of coils 25 has a surface area that is greater than at least one of the plurality of coils 25 and when in a non-contact position extends over one or more of the plurality of coils 25. The second surface 40B is coupled to the pliable material 30. The pliable material 30 enables the conductive target 40 to move with respect to the plurality of coils 25 in response to contact forces applied thereto. For example, the pliable material 30 may compress, twist, translate, or otherwise cause the conductive target 40 to move in response to applied contact forces.

In some embodiments, the conductive target 40 includes a compliant material 45. The compliant material 45 may be coupled to and/or formed over a portion of the conductive target 40. The compliant material 45 may be generally applied to the surface of the conductive target 40 that is opposite the surface coupled to the pliable material 30. The compliant material 45 may be a neoprene, rubber-like, latex, or similar material that assists in providing a friction surface for shear forces or other non-perpendicular forces applied to the surface of the conductive target 40. In some embodiments, the compliant material 45 may extend over the surface of the conductive target 40 and the pliable material 30 thereby coupling to the housing (e.g., the upper structure 10) to constrain the conductive target 40 and the pliable material 30 in the X-Y directions. This configuration may also be used to pre-compress the pliable material 30. It should be understood that the compliant material 45 is not provided in some embodiments.

The housing may further include openings 22 in either or both the upper structure 10 and/or the lower structure. The openings 22 may provide access to connections between flexible tactile sensor 127 modules and/or computing devices. The connections may be electrical and/or mechanical. Electrical connections may be facilitated by electrical terminal disposed on the PCB 20 within the housing and wiring harnesses and mating connectors extending through the openings. Mechanical connections may be implemented to connect multiple flexible tactile sensor 127 modules together in a row, a column, or an array. In other embodiments, no openings are provided.

The lower structure 12 of the housing includes the PCB 20 and other electronic components. In some embodiments, a ferrite material (not shown) may be positioned between the PCB 20 and the lower structure 12. The ferrite material may be in the form of a sheet and configured to constrain the electromagnetic field created by the plurality of coils 25 disposed in or on the PCB 20. This concentrates the magnetic flux and redirects it toward the conductive target 40, which may also increase the range of the sensor. In some embodiments, a ferrite material may be applied to the first surface 40A of the conductive target 40. The application of a ferrite material on the first surface 40A of the conductive target 40 may further help prevent the plurality of coils 25 from sensing beyond the conductive target 40. This may be beneficial when objects that the flexible tactile sensor 127 is interfacing with are large metallic objects such as pots and pans.

Figure 6B:
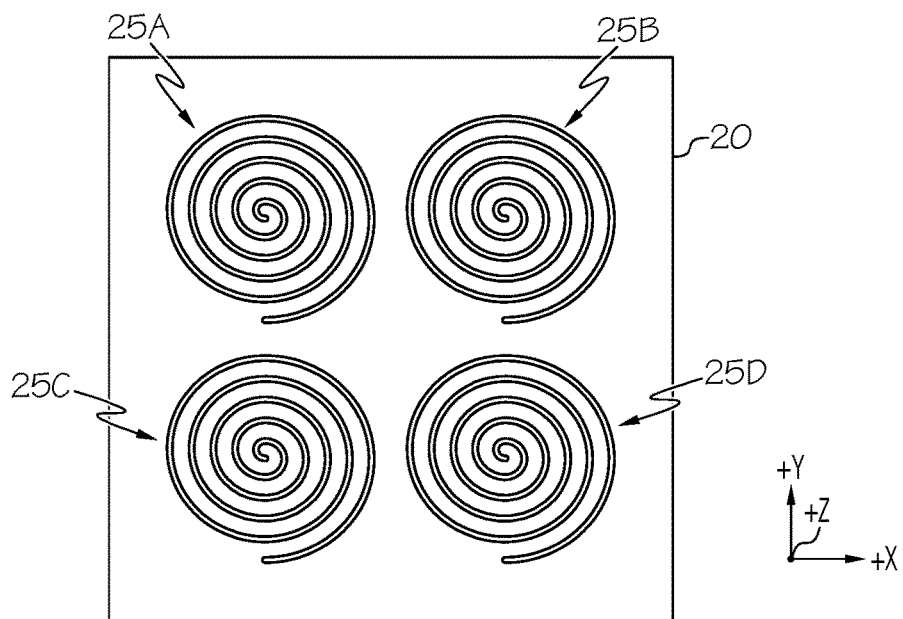
FIG. 6B schematically depicts a top-down view of an illustrative coil arrangement for a flexible tactile sensor according to one or more embodiments described and illustrated herein.

Turning to FIG. 6B, a top-down view of an illustrative coil arrangement for a flexible tactile sensor is depicted. Coil arrangements of the present disclosure include at least three coils arranged in a planar array configuration with each other. FIG. 6B depicts a PCB 20 that includes four coils 25A, 25B, 25C, and 25D. The coils 25A-25D (collectively referenced as coils 25) may be configured on or within the PCB 20. That is, the coils 25 may be formed on the surface of the PCB 20 as a layer of the PCB 20 or the coils may be formed and/or embedded with the PCB 20. The coils are planar coils having a predetermined number of turns. Configurations of three or more coils 25 enable rich sensing having multiple points of measurement. That is, compound rotations about the X and Y-axes enable the sensor to measure the normal force vector.

Figure 6C:
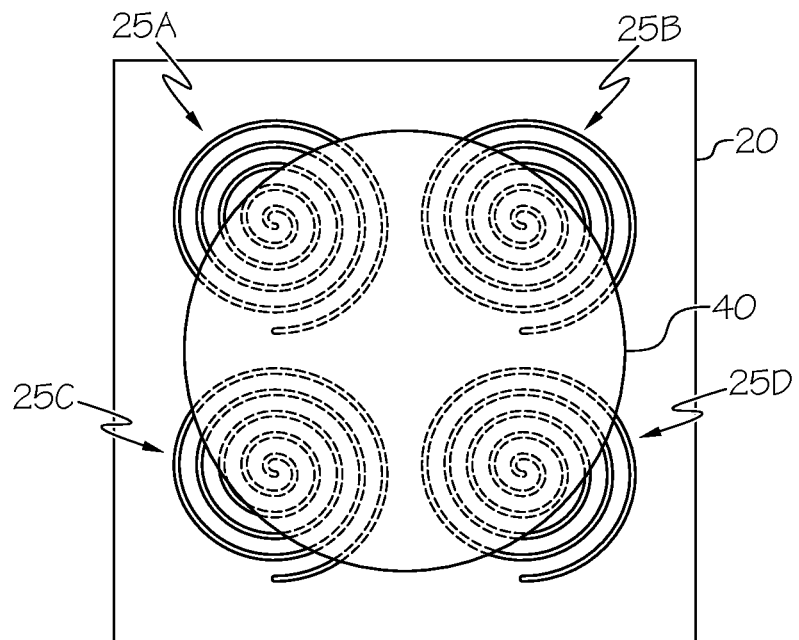
FIG. 6C schematically depicts a top-down view of an illustrative coil arrangement on a printed circuit board and positioned below a conductive target of a flexible tactile sensor according to one or more embodiments described and illustrated herein.
Figure 6D:
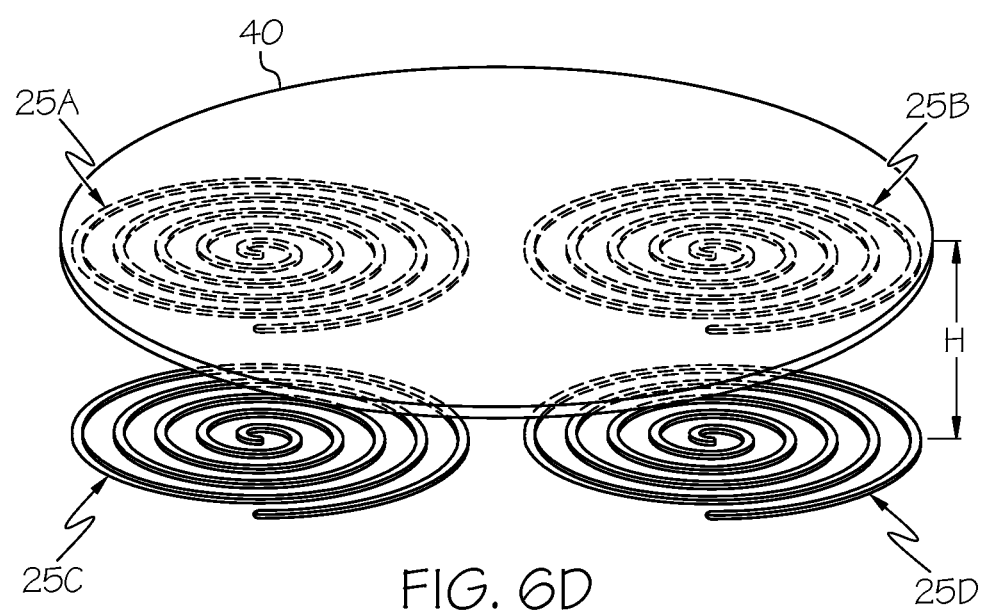
FIG. 6D schematically depicts a perspective side view of an illustrative coil arrangement positioned below a conductive target of a flexible tactile sensor according to one or more embodiments described and illustrated herein.

Turning to FIG. 6C, the top-down view of the flexible tactile sensor depicted in FIG. 6B now shows the conductive target 40. The conductive target 40 as described herein, is positioned, for example, in vertical alignment with the plurality of coils 25 such that a portion of the conductive target 40 vertically aligns with the plurality of coils 25. The flexible tactile sensor depicted in FIG. 6C is in a contactless state. Additionally, the conductive target 40 is depicted as a circular disc. However, in other embodiments, the conductive target 40 may have other shapes such as a triangular plate or a square plate. The shape of the conductive target 40 may be selected in conjunction with the arrangement of the array of three or more coils 25. FIG. 6D depicts a perspective side view of the illustrative coils 25 and conductive target 40 depicted in FIG. 6C. Here, FIG. 6D shows that the conductive target 40 is spaced apart from the coils 25 by a height H. The spacing between the conductive target 40 and the coils 25 may be occupied by the pliable material 30, which enables the conductive target 40 to move with respect to the coils 25. As described in more detail herein, as the respective height between the conductive target 40 and select coils 25 changes the inductance of the coils changes, which may be sensed and used to determine the change in position of the conductive target 40.

Figure 6E:
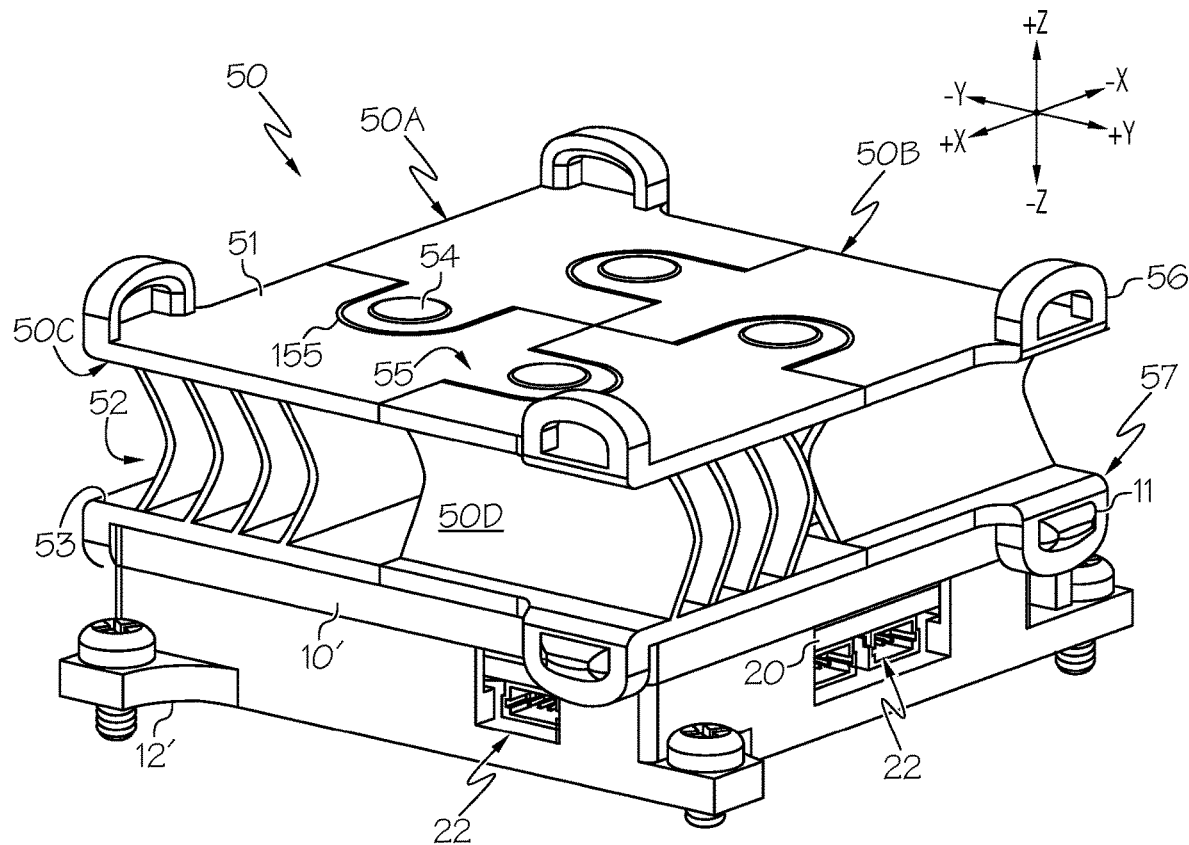
FIG. 6E schematically depicts a perspective view of an illustrative flexible tactile sensor having a modular flexible layer according to one or more embodiments described and illustrated herein.

Turning to FIG. 6E, a perspective view of an illustrative flexible tactile sensor 127. In particular, the embodiment depicted in FIG. 6E includes a non-limiting example of a modular flexible layer 50 forming a mechanical structure type of pliable material 30. For example, the pliable material 30 may be a 3D-printed, molded, machined, or otherwise formed structure. The modular flexible layer 50 functioning as the pliable material 30 portion of the flexible tactile sensor 127 may comprise a plurality of interlocking segments 50A, 50B, 50C, and 50D that can independently flex thereby enabling the modular flexible layer 50 to support the conductive target 40 (not shown in FIG. 6E) and respond to forces applied to the conductive target 40. For example, each of the plurality of interlocking segments 50A, 50B, 50C, and 50D includes a first surface 51 opposite a second surface 53. The first surface 51 and the second surface 53 are interconnected by a plurality of flexible members 52. The plurality of flexible members 52 may be configured to bend, flex, or fold when stressed and return to a relaxed positioned when the source of stresses are removed. For example, the plurality of flexible members 52 may be rib shaped structures extending from the first surface 51 to the second surface 53. However, embodiments are not limited to rib shaped structures. Furthermore, each of the plurality of interlocking segments 50A, 50B, 50C, and 50D includes a first interlocking feature 55 configured to receive a second interlocking feature 54. For example, the first interlocking feature 55 may be a flange having a receptacle for receiving the second interlocking feature 54. The first interlocking feature 55 and second interlocking feature 54 are positioned on different edges of each of the plurality of interlocking segments 50A, 50B, 50C, and 50D so that one interlocking segment 50A may be connected to another interlocking segment 50B.

Each of the plurality of interlocking segments 50A, 50B, 50C, and 50D further include a third interlocking feature 56 extending vertically (+Z-axis direction) from the first surface 51 of each of the plurality of interlocking segments 50A, 50B, 50C, and 50D. The third interlocking features 56 are configured to mate with a corresponding feature on the conductive target 40 thereby coupling the modular flexible layer 50 with the conductive target 40. Similarly, each of the plurality of interlocking segments 50A, 50B, 50C, and 50D further include a fourth interlocking feature 57 extending vertically (−Z-axis direction) from the second surface 53 of each of the plurality of interlocking segments 50A, 50B, 50C, and 50D. The fourth interlocking features 57 are configured to mate with a corresponding feature on the upper housing structure 10' thereby coupling the modular flexible layer 50 with the upper housing structure 10'. The upper housing structure 10' couples to a lower housing structure 12' which function similar to the upper and lower structures 10 and 12 depicted and described with reference to FIG. 6A.

Figure 6F:
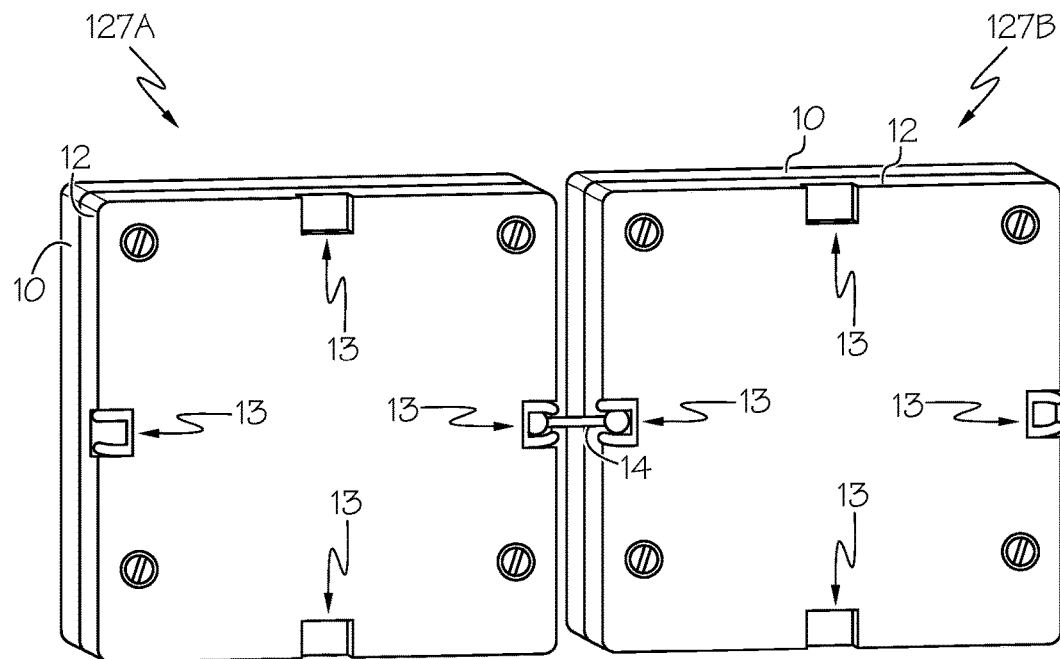
FIG. 6F schematically depicts a bottom perspective view of a connecting means for coupling two or more flexible tactile sensor modules according to one or more embodiments described and illustrated herein.

Referring to FIG. 6F, a bottom perspective view of a connecting means for coupling two or more flexible tactile sensor modules 127A and 127B together is depicted. For example, in some embodiments the lower structure 12 may include receiving cavities 13 formed along the edges of the bottom surface of the lower structure 12. A receiving cavity 13 of a first flexible tactile sensor module 127A may be configured to receive a first end of a connecting member 14. Another receiving cavity 13 of a second flexible tactile sensor module 127B may be configured to receive a second end of the connecting member 14. The connecting member 14 may couple to the receiving cavities 13 through an interference or friction type connection. However, the coupling of two or more flexible tactile sensor modules 127A and 127B may not be limited to the specific embodiment described herein. Two or more flexible tactile sensor modules 127A and 127B may be fastened to each other through any known fastening means resulting in a rigid or flexible connection between the two or more flexible tactile sensor modules 127A and 127B.

Figure 6G:
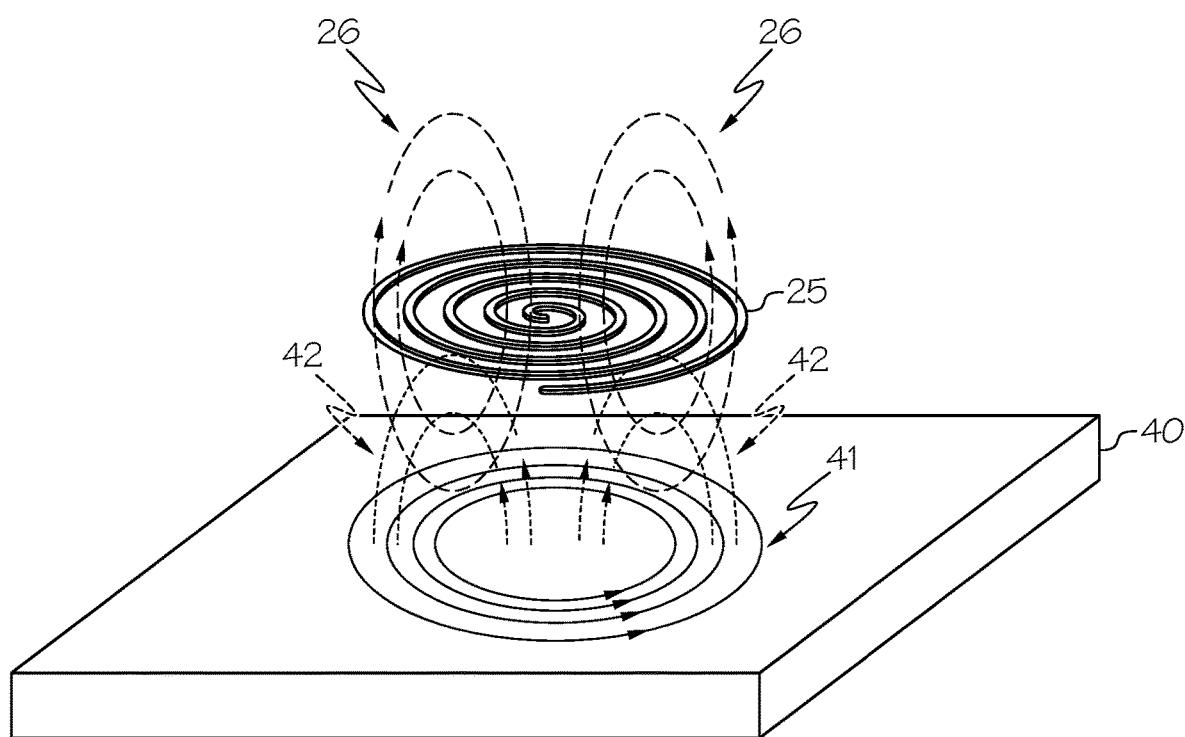
FIG. 6G schematically depicts an illustrative diagram of a magnetic field of a coil interacting with a conductive target according to one or more embodiments described and illustrated herein.

Referring now to FIG. 6G an illustrative diagram of a magnetic field of a coil 25 interacting with a conductive target 40 is depicted. When current (e.g., alternating current AC) flows through the coil 25 an AC magnetic field 26 is induced. The magnetic field 26 will induce eddy currents 41 in nearby conductors such as a conductive target 40.

The eddy currents 41 are a function of the distance, size, and composition of the conductor. The eddy currents 41 generate their own magnetic field 42, which opposes the original field 26 generated by the coil 25 (also referred to as the sensor inductor). By opposing the original field 26, the original field 26 is weakened. This produces a reduction in inductance compared to the inductor's free space inductance. The interactions between these structures are phenomena known as inductive coupling. That is, the eddy currents 41 induced on the conductive target 40 flow in such a way that they weaken the magnetic field 26 of the source coil 25 according to Lenz's Law. As the conductive target 40 moves closer to the coil 25 the eddy currents 41 increase, and the magnetic field 26 of the source coil 25 weakens further. When the inductance of the system is reduced, the resonant frequency of the coil 25 increases.

Additional information regarding example flexible tactile sensors 127 is provided in U.S. patent application Ser. No. 17/344,354, which is hereby incorporated by reference in its entirety.

It should be understood that embodiments are not limited by the flexible tactile sensors 127 illustrated by FIGS. 6A-6G, and that other sensors may be utilized.

Figure 7:
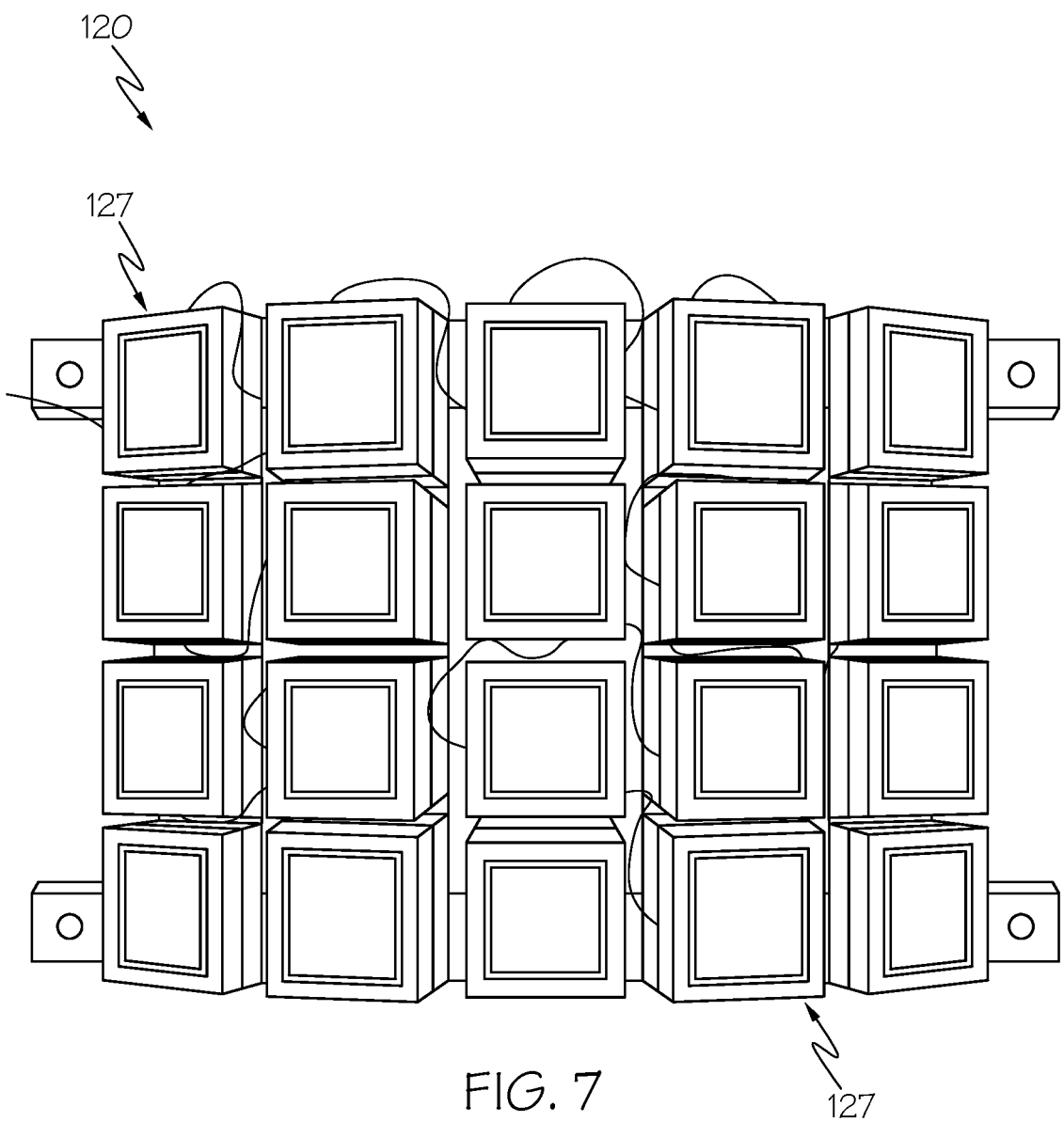
FIG. 7 schematically depicts front view of an array of flexible tactile sensors of a body structure of a robot 1 according to one or more embodiments described and illustrated herein.

Referring now to FIG. 7, the array of flexible tactile sensors 127 may be configured as an array of columns and rows. However, in other embodiments the flexible tactile sensors 127 may be arranged in a circular array, an elliptical array, or an irregular array.

Figure 8:
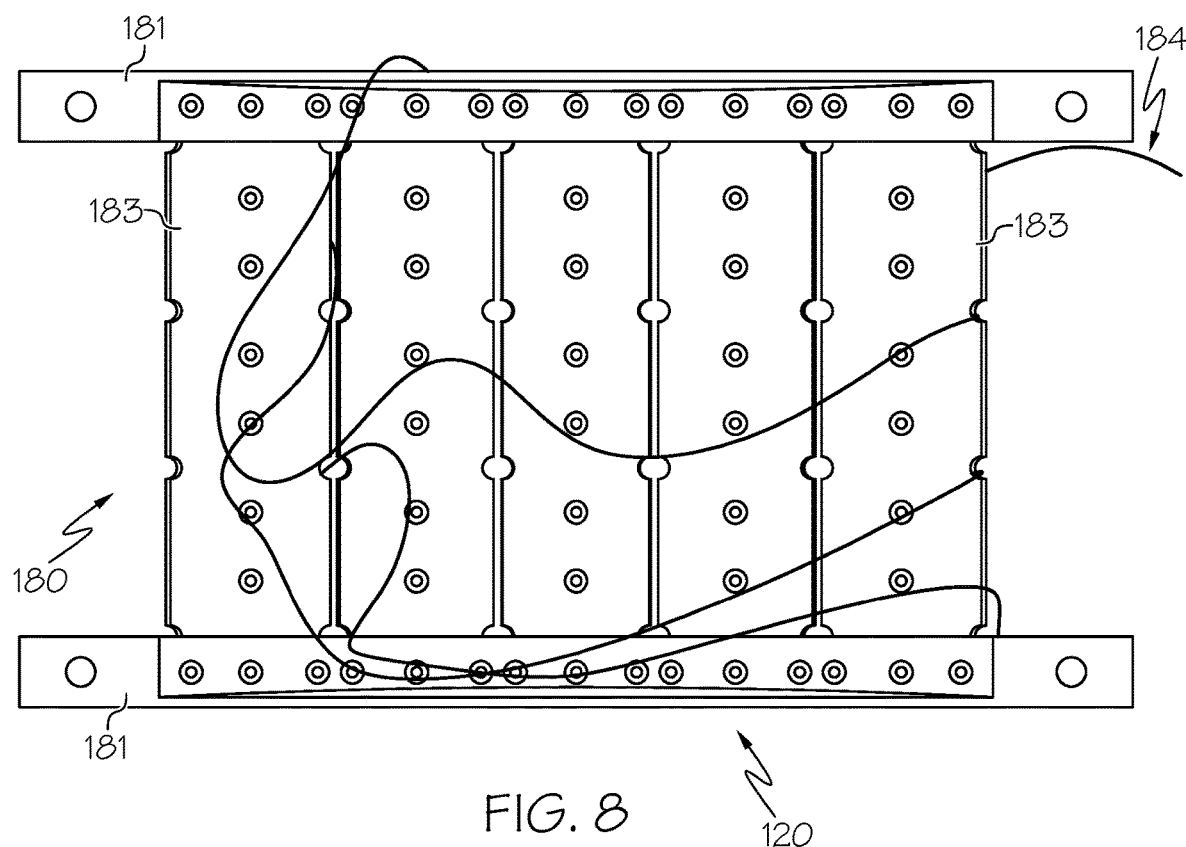
FIG. 8 schematically depicts rear view of the body structure illustrated by FIG. 7 according to one or more embodiments described and illustrated herein.

As shown in FIG. 7, the array of flexible tactile sensors 127 may be arranged in an arcuate manner such that the body structure 120 has a convex shape. In this manner, the body structure 120 may be shaped in a similar manner as a person's body core, such as a person's chest. Referring now to FIG. 8, the body structure 120 of the example robot 100 includes an arcuate base 180 on which the array of flexible tactile sensors 127 are attached. FIG. 8 illustrates a rear surface of the arcuate base 180. The example arcuate base 180 includes two crossbar members 181 and a plurality of slats 183 that are coupled to the two crossbar members 181 (e.g., by fasteners) to define an arcuate (i.e., convex) surface on which the array of flexible tactile sensors is attached. Wiring 184 for connecting the individual flexible tactile sensors 127 to a processor of the robot 100 may be routed through the slats 183, for example. The crossbar members 181 can be changed out to modify the curve of the chest. The illustrated configuration has a slight convex curve with the surface of each slat (and thus the base of each force/geometry sensor) angled 170° from those horizontally adjacent. This curve could be updated to have a more or less extreme angle between the slats, or to even be concave, in order to support different types of grasps.

Figure 9A:
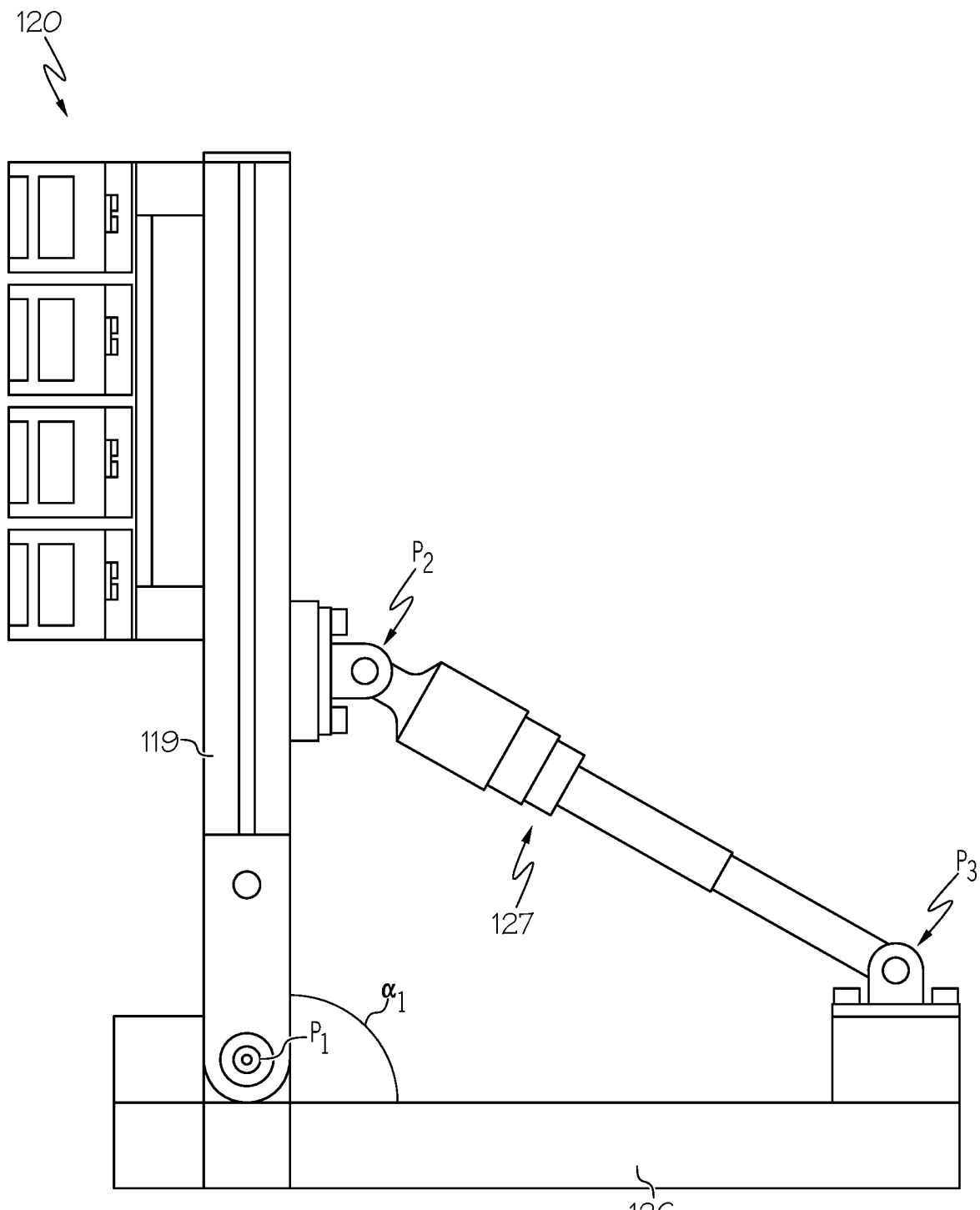
FIG. 9A schematically depicts a side view of an example body structure of a robot in an upright position 1 according to one or more embodiments described and illustrated herein.

Embodiments of the present disclosure may also provide for the ability for the body structure 120 to tilt backwards, much like a human does when she leans backwards when supporting and carrying a large and/or heavy object. FIG. 9A illustrates a body structure 120 coupled to one or more vertical rails 119 (which may be the same or different than the vertical rail 111 illustrated in FIG. 1). The one or more vertical rails 119 may pivotably coupled to one or more tilt structure support members 126 at pivot point $P_1$. A tilt structure 124 is pivotably coupled to the one or more vertical rails 119 at pivot point $P_2$ and pivotably coupled to the tilt structure support member 126 at pivot point $P_3$. The tilt structure 124 is operable to tilt the body structure 120 in a backward direction away from a rail system defined by the one or more vertical rails 119 to support an object. The tilt structure 124 may be any component capable of tilting the one or more vertical rails 119 (i.e., the rail system) and the body structure 120. Non-limiting examples of components for the tilt structure 124 include a linear motor, a hydraulic jack, and a pneumatic jack.

Figure 9B:
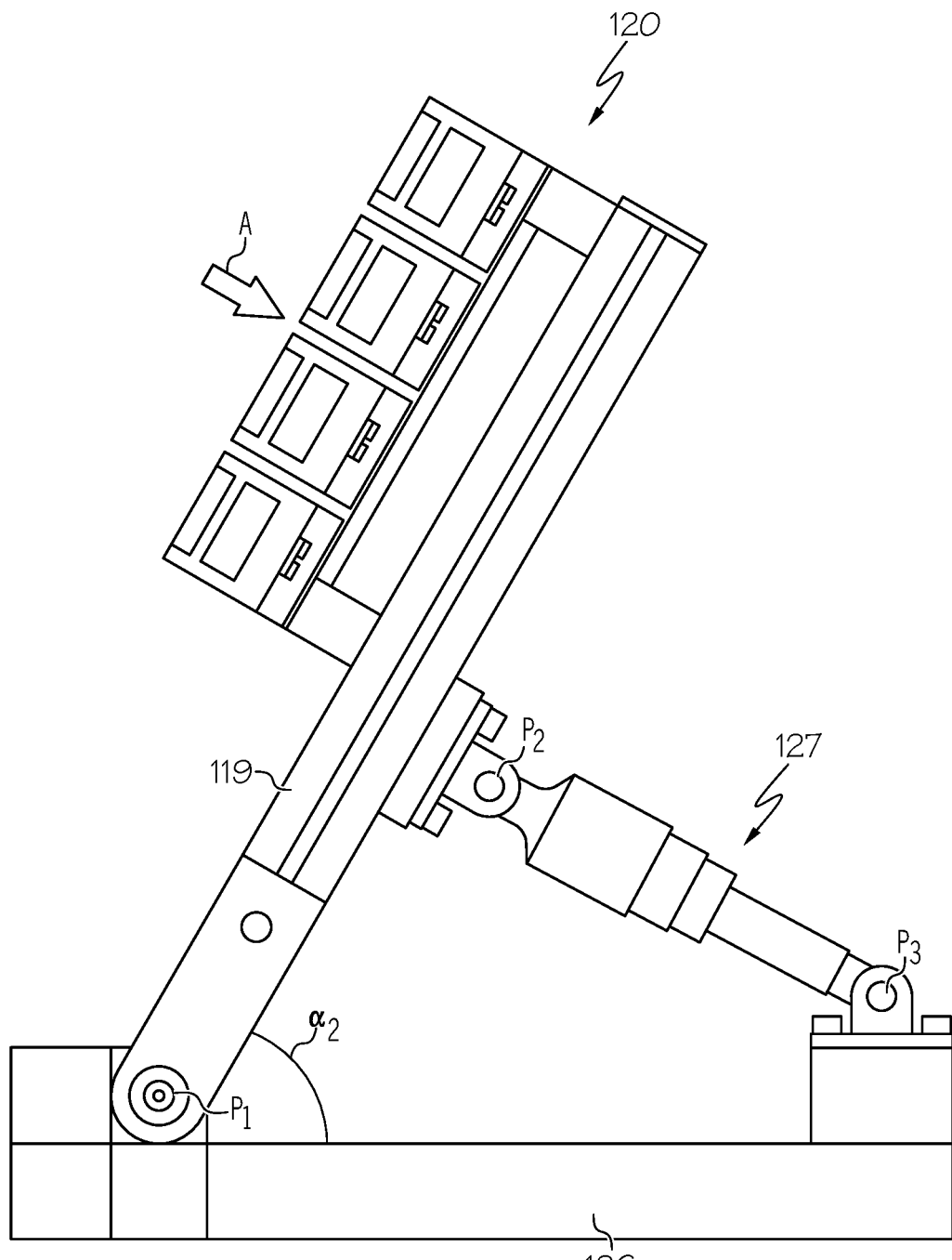
FIG. 9B schematically depicts a side view of the example body structure illustrated by FIG. 9A in a tilted position 1 according to one or more embodiments described and illustrated herein.

FIG. 9A illustrates the tilt structure 124 in an extended position such that the one or more vertical rails 119 are upright and an angle $\alpha_1$ between the one or more vertical rails 119 and the tilt structure support member 126 is about 90°. FIG. 9B illustrates the tilt structure 124 in a retracted position such that the one or more vertical rails 119 and thus the body structure 120 tilts back as indicated by arrow A, and an angle $\alpha_2$ between the one or more vertical rails 119 and the tilt structure support member 126 is less than angle $\alpha_1$. Thus, the tilt structure 124 may assist the robot 100 in supporting a large and/or heavy object.

Referring once again to FIG. 1, the two arms 130 are adjacent to the body structure 120. The arms 130 may have any number of segments and any number of actuatable joints. Each arms 130 further includes an end effector 140, which in the illustrated embodiment is a soft bubble gripper configured for gripping an object by contact. The two arms 130 are operable to wrap around an object, and press the object against the body structure 120, much like a human would wrap her arms around an object and press the object against her core (i.e., stomach and/or chest).

Figure 10:
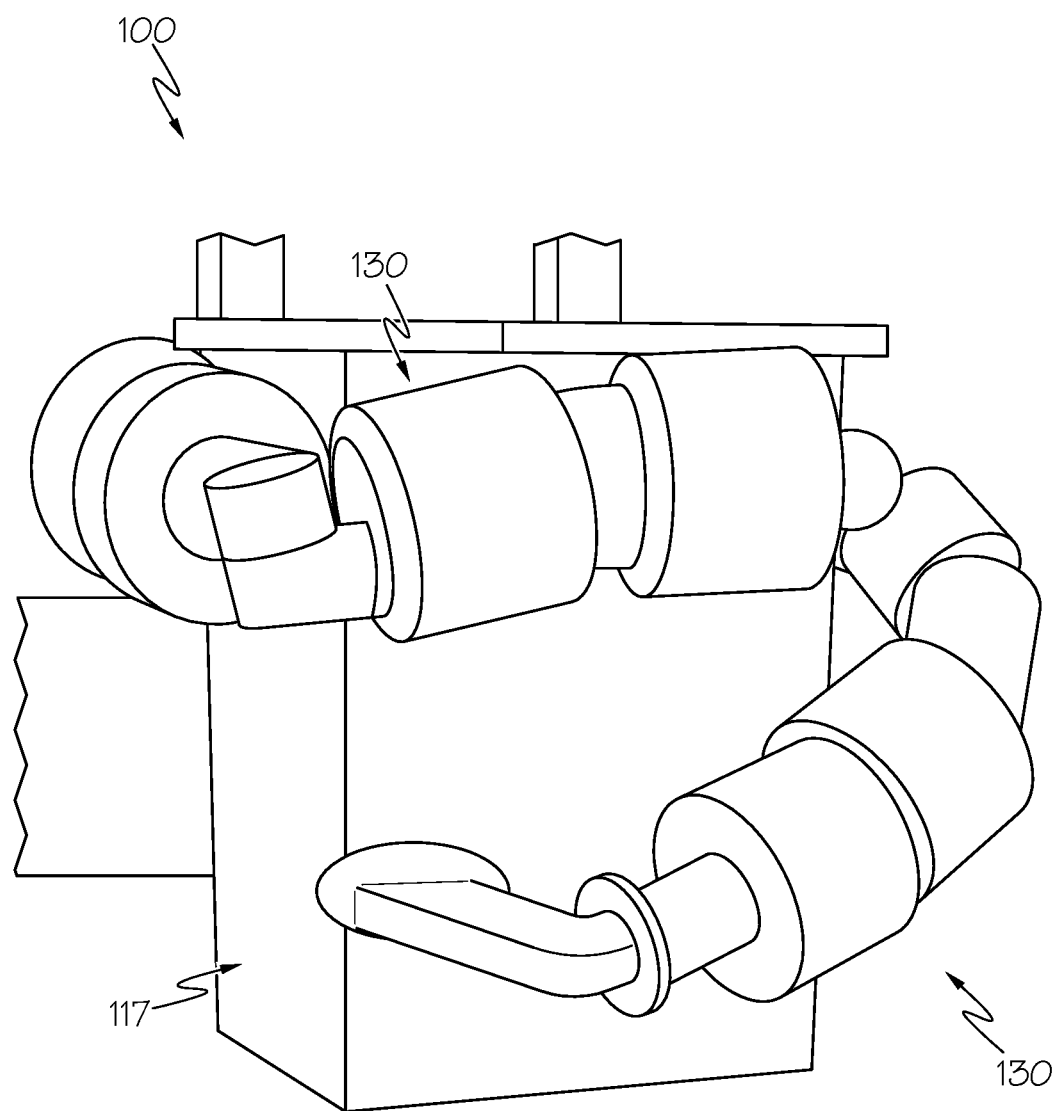
FIG. 10 schematically depicts an example robot holding a hamper with its arms according to one or more embodiments described and illustrated herein.

FIG. 10 illustrates an example robot 100 having its arms 130 wrapped around a box 117 such that the box 117 is pressed against the body structure 120 (not visible in FIG. 10). The lift actuator 125 is operable to lift the box 117 as well as lower the box 117 along the vertical rail 111. The tilt structure 124 is operable to tilt the box 117 backwards to further support the hamper 117.

To perform the grasping of a large object, such as the hamper 117 shown in FIG. 10, it may be desirable to provide tactile sensing on the arms 130 of the robot 100 such that the robot may understand how it is contacting and grasping the object by feedback. Referring once again to FIG. 1, each arm 130 has a plurality of deformable sensors 150 disposed thereon. The deformable sensors 150 are also referred to as sensor devices herein. The deformable sensors 150 act as contact sensors that sense contact between an object and the arm 130. The deformable sensor 150 may generate a signal when contact is made against it. Any number of deformable sensors 150 may be provided on each arm. In the illustrated embodiment, each segment of the robot arms 130 has a deformable sensor 150 around it.

Figure 11:
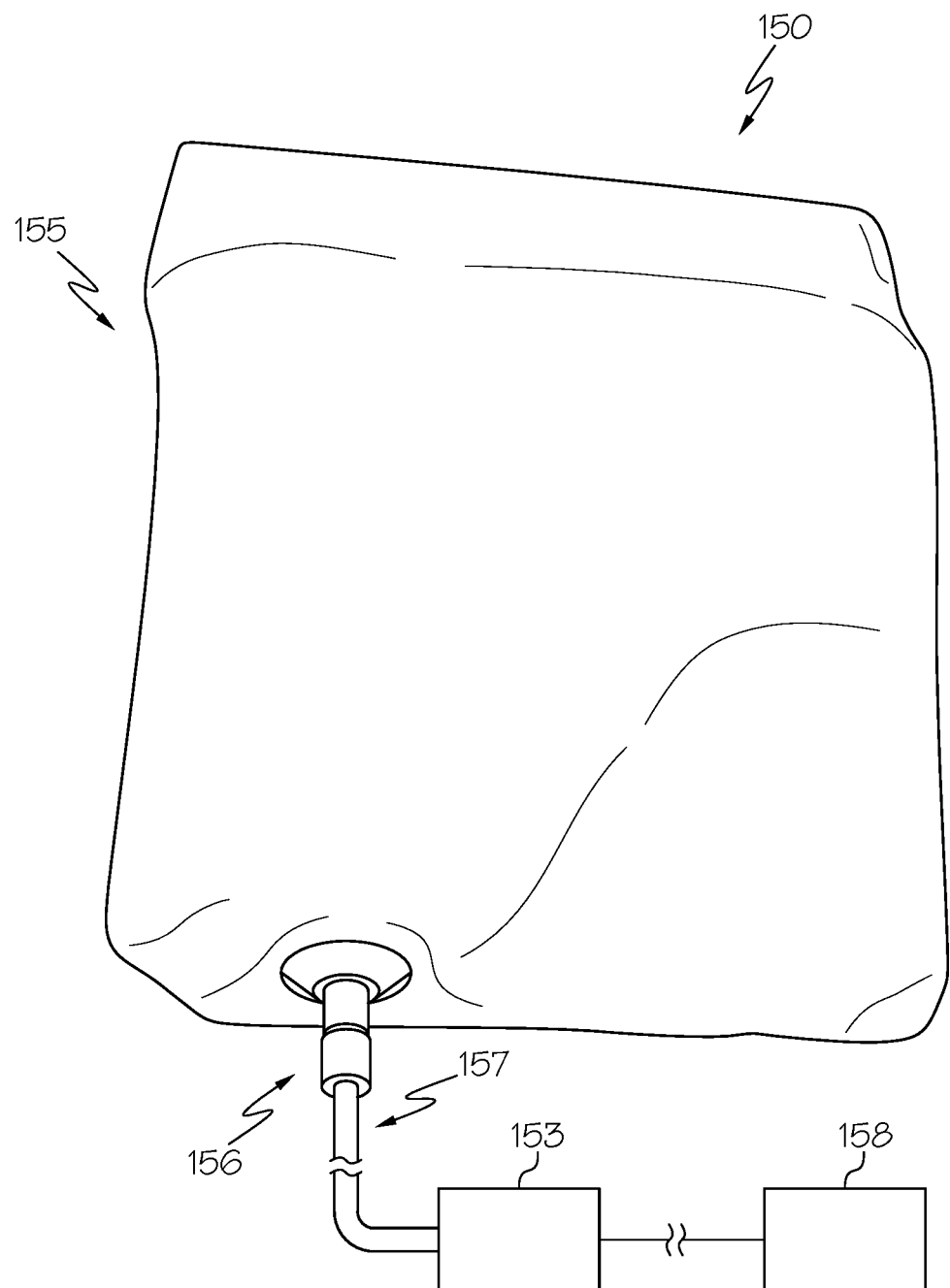
FIG. 11 schematically depicts an example deformable sensor according to one or more embodiments described and illustrated herein.
Figure 12:
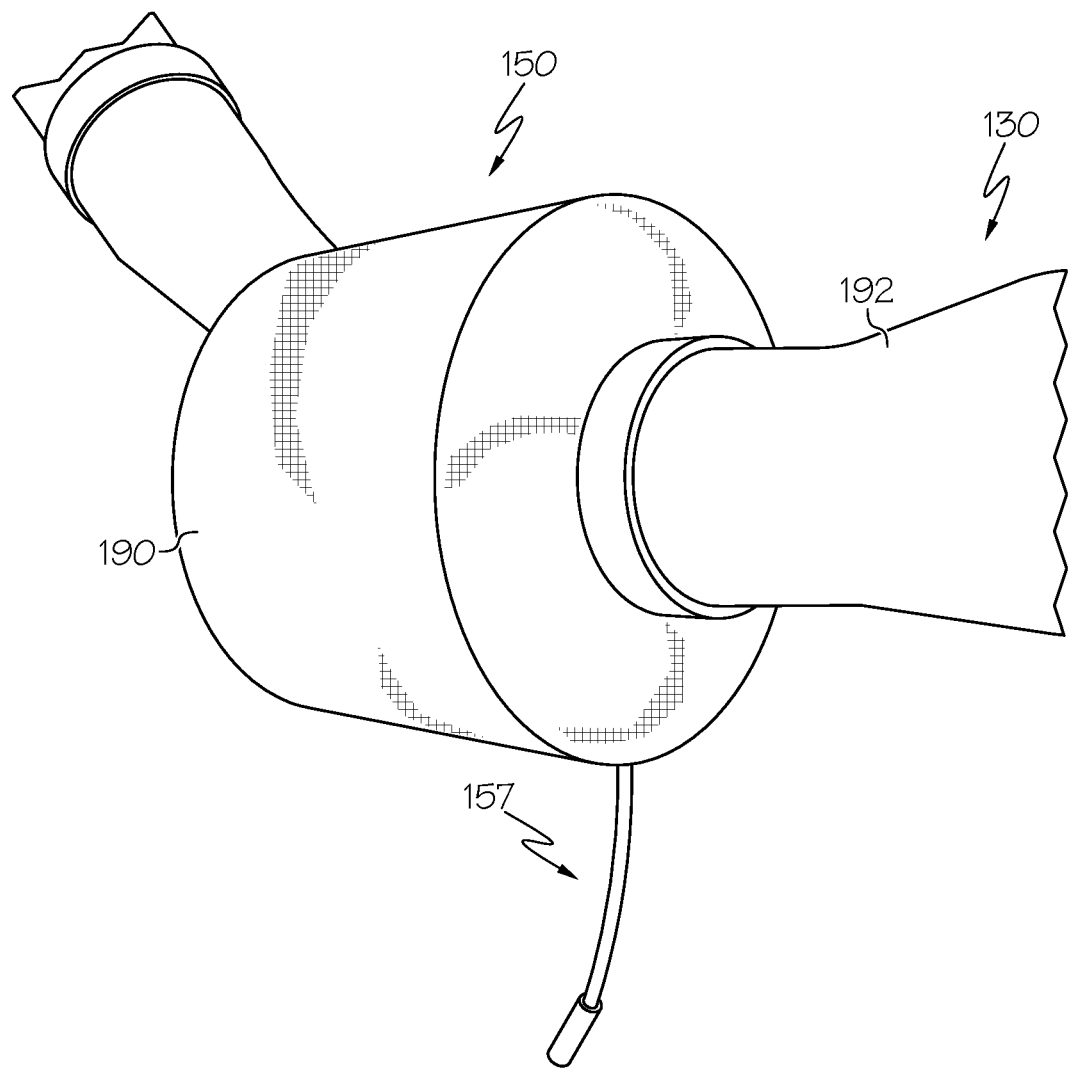
FIG. 12 schematically depicts a deformable sensor on a rigid segment of a robot arm according to one or more embodiments described and illustrated herein.

Referring now to FIG. 11, an example deformable sensor 150 is illustrated. The deformable sensor 150 generally comprises an inflatable diaphragm 155 having a port 156, a pressure sensor 153, and a tubing 157 that fluidly couples the port 156 to the pressure sensor 153. The inflatable diaphragm 155 may be made of a deformable material, such as, without limitation, polyvinyl chloride. The inflatable diaphragm 155 may be configured as a ring that can be disposed around a segment of the robot arms 130. FIG. 12 shows how a deformable sensor 150 may be disposed around a segment 192 of a robot arm 130.

Referring once again to FIG. 11, the inflatable diaphragm 155 may also include an inflation port that is utilized to inflate the inflatable diaphragm 155 to the desired pressure. The pressure sensor 153 may be maintained at a location separate from the inflatable diaphragm 155. For example, the pressure sensor 153 may be maintained within a body or other housing of the robot 100. Although the pressure sensor 153 is illustrated as being remote from the inflatable diaphragm, it should be understood that it may be provided within the inflatable diaphragm 155. In such embodiments, one or more signal wires may be provided to one or processors within the robot 100 to communicate a pressure reading. Alternatively, the pressure sensor may wireless communicate pressure readings to the one or more processors within the robot 100.

The pressure sensor 153 is operable to detect a pressure within the inflatable diaphragm 155, and provides a scalar pressure value. When contact is made with inflatable diaphragm 155, the pressure increases because the interior volume within the inflatable diaphragm 155 decreases. When the pressure within the inflatable diaphragm 155 meets a predetermined criteria, contact with the deformable sensor 150 may be inferred. For example, when the pressure sensor 153 detects a pressure above a predetermined threshold, a processor 158 or other component may generate a contact signal indicating contact with the deformable sensor 150. As another example, when a pressure within the inflatable diaphragm as measured by the pressure sensor 153 changes by a threshold percentage (e.g., a 10% increase), a processor or other component may generate a contact signal indicating contact within the deformable sensor 150. When the pressure within the inflatable diaphragm 155 does not meet a predetermined criteria, a processor or other component may not produce a contact signal. In this manner, the deformable sensor 150 may act as a contact sensor for the arms (and/or other components) of the robot 100.

Referring once again to FIG. 12, a deformable sensor 150 is disposed around a segment 192 of a robot arm 130. In some embodiments, the deformable sensor 150 further comprises an outer cover layer 190 disposed around the inflatable diaphragm 155. The outer cover layer 190 has properties to protect the inflatable diaphragm 155 from being cut or punctured by a sharp object, like a knife, that may be present in uncontrolled, cluttered environments. Thus, the outer cover layer 190 should have a suitable strength to prevent the inflatable diaphragm 155 from being cut or punctured. The outer cover layer 190 may cover both the exterior surface of the inflatable diaphragm 155 as well as an interior surface of the inflatable diaphragm 155 that faces the arm 130 (or other robot component).

As non-limiting examples, the material may have a strength greater than or equal to 30 cN/dtex, greater than or equal to 35 cN/dtex, greater than or equal to 40 cN/dtex, or greater than or equal to 45 cN/dtex. As further non-limiting examples, the outer cover layer may be fabricated from ultra-high molecular weight polyethylene or poly-paraphenylene terephthalamide. As a further non-limiting example, the outer cover layer 190 may be fabricated from Dyneema made by Royal DSM of The Netherlands.

In some embodiments, a first material provides the high strength for the outer cover layer 190, and a second material is provided to provide another function. For example, a high friction second material may be woven with the first material to increase the coefficient of friction of the outer cover layer 190 with respect to an object. Thus, the second material has a coefficient of friction with respect to an object that is greater than a coefficient of friction of the first material with respect to the same object. Such a second material having a high coefficient of friction may prevent the robot 100 from dropping an object due to the object slipping against the outer cover layer 190 of the deformable sensor 150.

In some embodiments, the second material may be a conductive material that is woven with the first material, or a third material that is conductive is woven with the first material and the second material to provide an additional functionality of capacitive sensing. Thus, the outer cover layer 190 may detect contact with an electrically conductive object, such as a metal object or a person's hand.

It should be understood that the deformable sensors 150 described herein may be provided on any robot of any configuration, and are not limited to being applied to the robot 100 illustrated in FIGS. 1-10.

Although the deformable sensors 150 detect contact with an object, they alone to not provide data relating to localized contact with the deformable sensors 150. In other words, each deformable sensor 150 can only detect whether or not contact with an object was made and not the specific location on the deformable sensor 150 where contact was made. Thus, in some embodiments, additional sensors may be provided to provide localized contact feedback regarding contact between the deformable sensors 150 and an object.

As a non-limiting example, an array of force sensors may be disposed on at least one of an inner surface of the inflatable diaphragm 155 (or outer cover layer 190, if provided) and an outer surface of the inflatable diaphragm 155 (or outer cover layer 190, if provided). As a non-limiting example, the array of force sensors may be disposed between the outer cover layer 190 and the inflatable diaphragm 155. As described in more detail below, the array of force sensors provides one or more signals indicative of a location of contact between an object and the deformable sensor 150.

Figure 13:
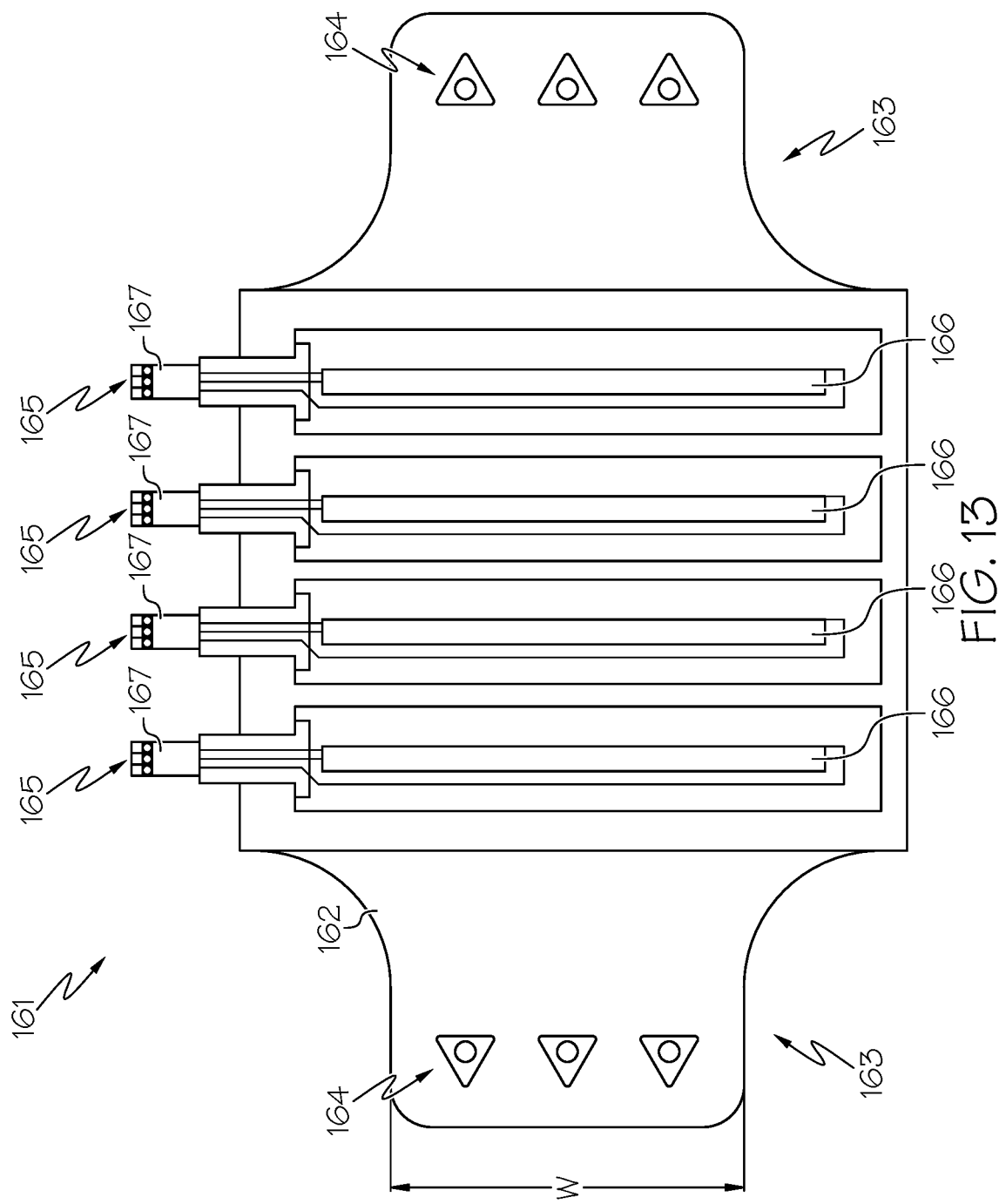
FIG. 13 schematically depicts a top-down view of an assembly providing an array of sensor according to one or more embodiments described and illustrated herein.

Referring now to FIG. 13, an example assembly 161 providing an array of force sensors 165 is illustrated. The illustrated array of force sensors 165 is configured as individual linear force sensors. As a non-limiting example, each force sensor 165 may be configured as carbon-doped linear potentiometers; however, other linear force sensors may be utilized. Each force sensor 165 provides a signal indicative of contact along its length. Although the array of force sensors 165 are illustrated as linear force sensors, it should be understood that individual, discrete force sensors may be utilized. In the illustrated example, each force sensor 165 has an electrical connector 167 for connecting to one or more wiring harnesses that provide respective contact signals to one or more processors of the robot 100.

In some embodiments, a force concentrator 166 is disposed on a top surface of each force sensor 165. The force concentrators 166 extend a height above the top surface of the force sensors 165. The force concentrators 166 may be fabricated from any material. As a non-limiting example, the force concentrators 166 may be fabricated from a rigid plastic or stiffened rubber. The force concentrators 166 increase the force sensors 165 sensitivity to contact, particularly when the force sensors 165 are disposed beneath the outer cover layer 190.

As shown in FIG. 13, the assembly 161 further includes a sensor housing 162 configured to receive the array of force sensors 165. The sensor housing 162 is made of a pliable material so that it may be wrapped around the robot arm 130 (or other robot component) or the inflatable diaphragm. The example sensor housing 162 includes two tabs 163 that have a width w that is less than that of the sensor housing 162 that receives the array of force sensors 165. The reduces width w may increase the flexibility of the sensor housing 162. It should be understood that other embodiments may not include tabs 163 having a reduced width.

In the illustrated embodiment, the sensor housing 162 includes securing features 164 at each tab 163 that may be used to secure the sensor housing 162 to the robot arm 130, the inflatable diaphragm 155, or the outer cover layer 190. The securing features 164 may be configured to receive an elastic member (such as elastic rope, a rubber band, and/or the like) to hold pull the two tabs 163 together to secure the sensor housing 162 to the desired component. It should be understood that other methods of securing the sensor housing 162 to the desired component may be provided.

Figure 14:
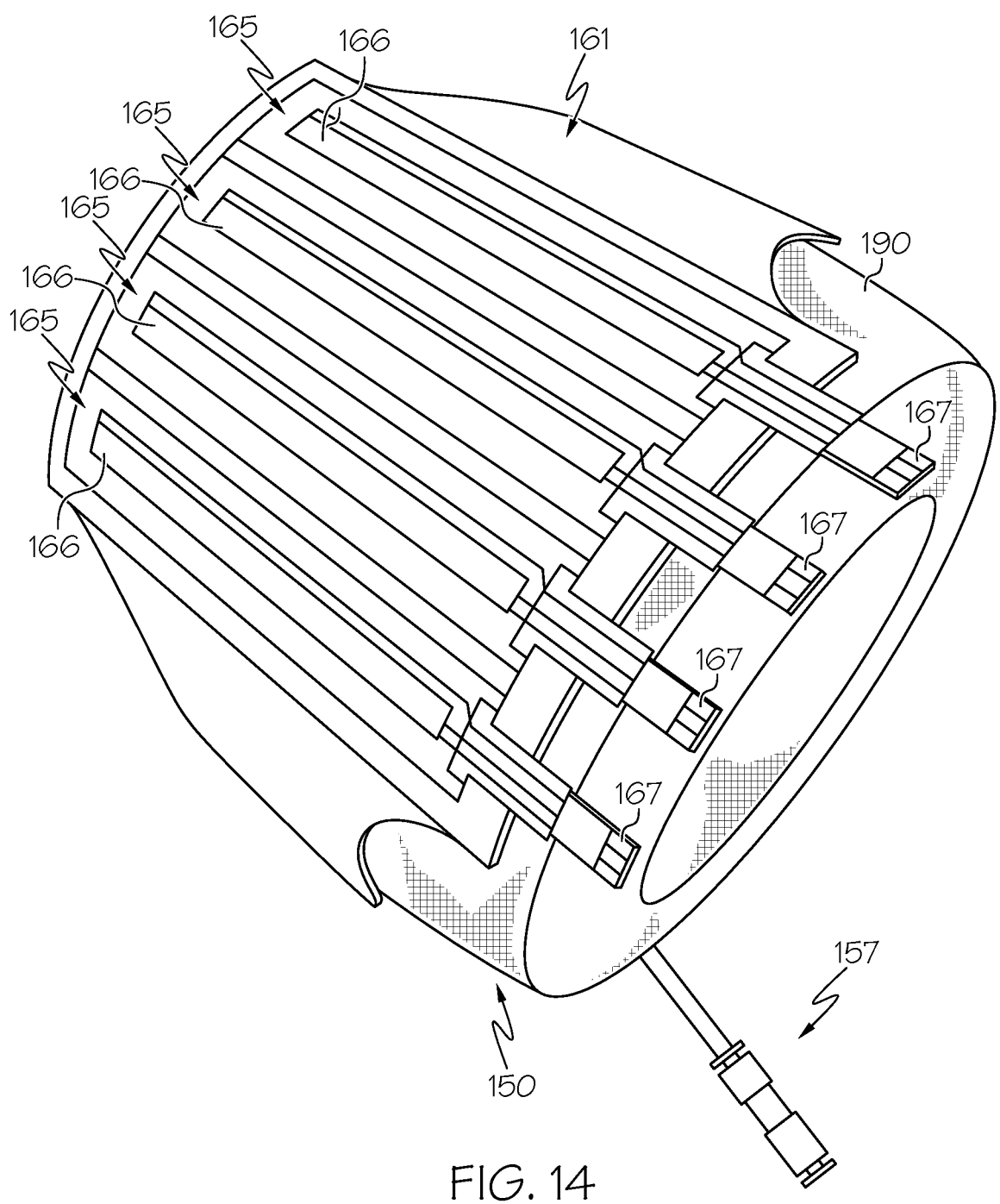
FIG. 14 schematically depicts a perspective view of the assembly of FIG. 13 disposed on an inflatable sensor according to one or more embodiments described and illustrated herein.
Figure 15:
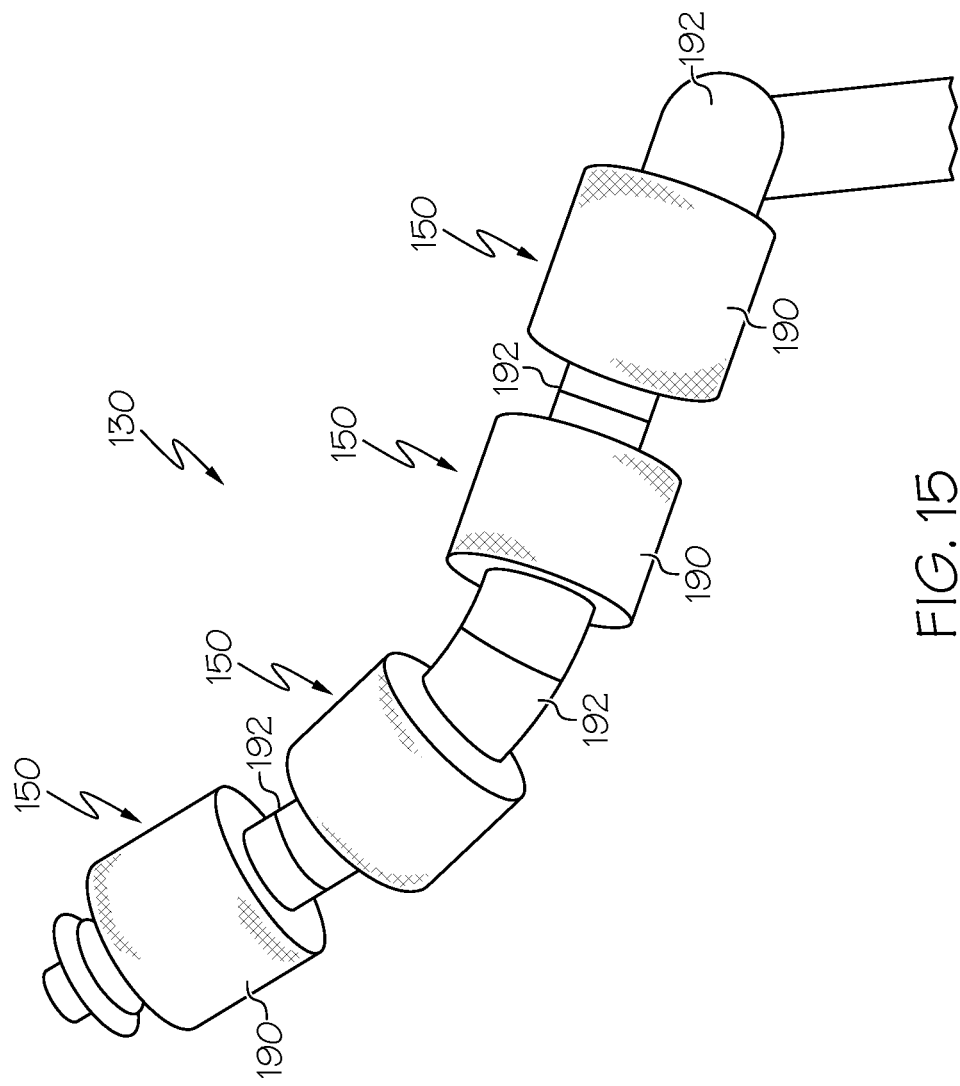
FIG. 15 schematically depicts a plurality of inflatable sensors disposed on segments of a robot arm according to one or more embodiments described and illustrated herein.

FIG. 14 illustrates the assembly 161 attached to an outer surface of an outer cover layer 190. However, in other embodiments the assembly 161 may be disposed under an outer cover layer 190, or even disposed on a rigid robot segment such that it is between the rigid robot segment and the deformable sensor 150. FIG. 15 illustrates a robot arm 130 having four deformable sensors 150 with outer cover layers 190 on four rigid segments 192 of the robot arm 130.

It should be understood that the assembly 161 having force sensors 165 may be applied to any robot or machine, and are not limited to being applied to the robot 100 illustrated by FIGS. 1-10.

In some cases, the deformable sensor 150 may undesirably slip up and/or down the robot 130, as well as rotate around the robot arm 130. This slipping and/or rotation of the deformable sensor 150 may cause errors in contact location signals, as well as may cause the robot 100 to drop an object. Thus, in some embodiments, structures may be provided on the rigid segments 192 of the robot 100 to prevent movement of the deformable sensor(s) 150. In other words, structures to limit movement of the deformable sensor(s) 150 may be positioned between the rigid segment(s) 192 and the deformable sensors(s) 150.

Figure 16:
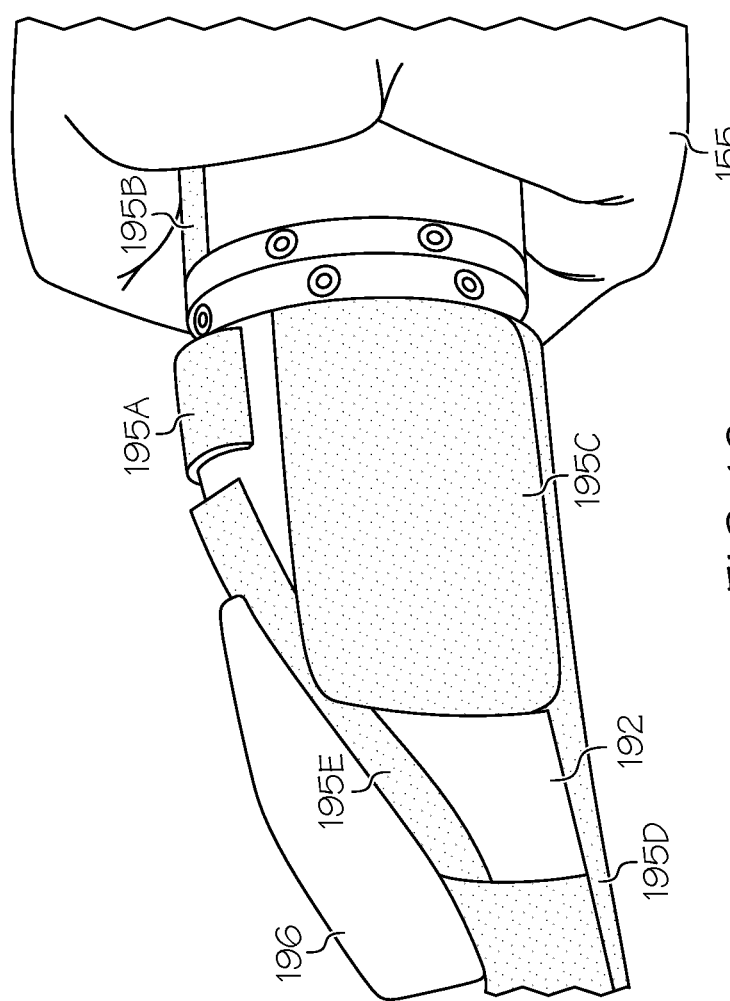
FIG. 16 schematically depicts members for preventing movement of a deformable sensor on a robot arm according to one or more embodiments described and illustrated herein.

Referring now to FIG. 16, an example rigid segment 192 of a robot having a member 196 for reducing the movement of a deformable sensor 150 is illustrated. As shown in FIG. 16, the member 196 is attached to the rigid segment 192. The member 196 may be attached in any manner (e.g., straps, fasteners, adhesive, and/or the like). In the illustrated embodiment, the member 196 is attached by a Velcro pad 195E. However, other means for attaching the member 196 may be utilized. FIG. 16 illustrates additional Velcro pads 195A-195D for attaching additional members (not shown) that prevent movement.

In some embodiments, the member(s) 196 is a compliant member. For example, the member (2) 196 may be made of a foam material that compresses upon contact with an object. A compliant member 196 may be more suitable than a rigid member because a compliant member 196 will provide more deformability, making for a softer robot 100.

The shape of the member 196 may be selected to conform to the particular rigid segment 192 to which it is attached. In the example of FIG. 16, the rigid segment 192 is tapered (i.e., it has a non-uniform thickness), which may lead to a member 196 also having a tapered shape to better accept the cylindrically shaped deformable sensor 150. For example, in the smaller surface area of the rigid segment 192, the member 196 may have a larger surface area than in the larger area of the rigid segment 192. The combination of the smaller portion of the rigid segment 192 and the larger area of the member 196 provides for a cylindrical shape around which the cylindrically shaped deformable sensor 150 is disposed.

Figure 17:
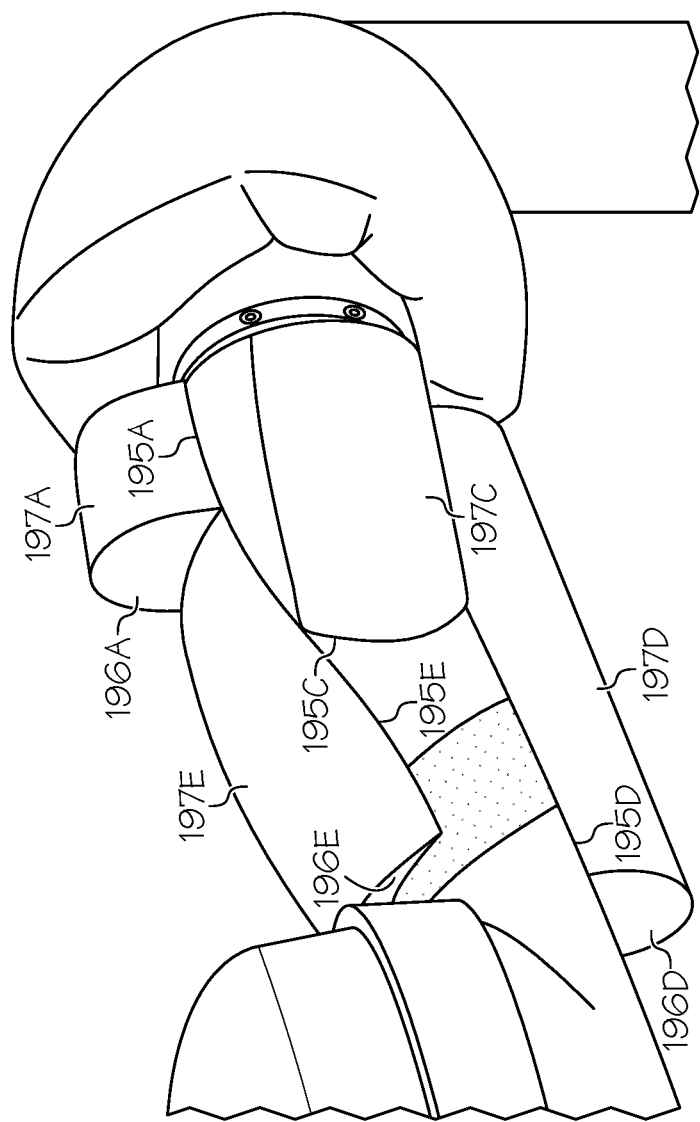
FIG. 17 schematically depicts the member shown in FIG. 16 and further including friction tape according to one or more embodiments described and illustrated herein.

Referring now to FIG. 17, any number of members 196A-196E (e.g., compliant members) may be disposed on an individual rigid segment 192 to prevent linear and/or rotational movement of a deformable sensor 150. Further, as shown in FIG. 17, one or more of the members 196A-196E may further comprise a friction tape 197A-197E to increase the coefficient of friction with respect to the deformable sensor 150 to further prevent movement. Thus, the members 196A-196E have a coefficient of friction with respect to the deformable sensor 150 that is greater than a coefficient of friction between the deformable sensor 150 and the rigid surface 192. Any friction tape may be utilized. In other embodiments, a high friction coating may be applied to one or more of the members 196A-196E in addition to, or instead of, friction tape. In yet other embodiments, no additional high friction components may be provided. Rather, the material of the members 196A-196E has a high enough coefficient of friction with respect to the deformable sensor 150 to prevent movement.

Figure 18:
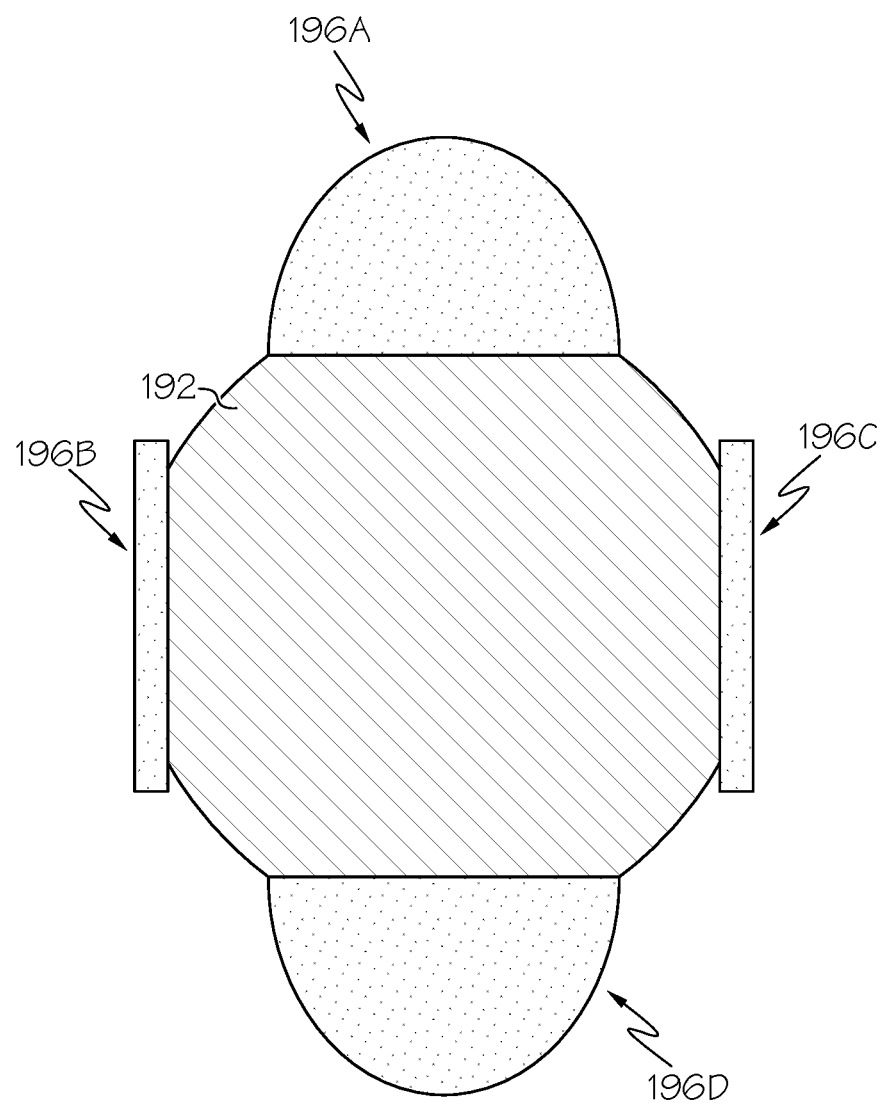
FIG. 18 schematically depicts a cross-sectional view of an example rigid segment and members for preventing movement of a deformable sensor according to one or more embodiments described and illustrated herein.

The number and shape of the members may be provided on a member to match an interior contour of a deformable sensor. FIG. 18 illustrates a cross-sectional view of the rigid segment 192 depicted in FIG. 17. The inflatable diaphragm 155 of the deformable sensor 150 may have "valleys" on the interior surface when fully inflated. These valleys are caused by a crease forming in the inflatable diaphragm upon inflation. In the embodiment of FIG. 18, two semi-elliptically shaped members 196A and 196D are on opposing surfaces of the rigid segment 192 and are configured to extend into the valleys of the interior surface of the deformable sensor 150. Two relatively flat members 196B and 196C are disposed on the other opposing surfaces of the rigid segment 192. By extending the semi-elliptically shaped members 196A, 196D into the valleys of the deformable sensor 150, rotational movement of the deformable sensor 150 with respect to the rigid segment 192 may be prevented.

Figure 19:
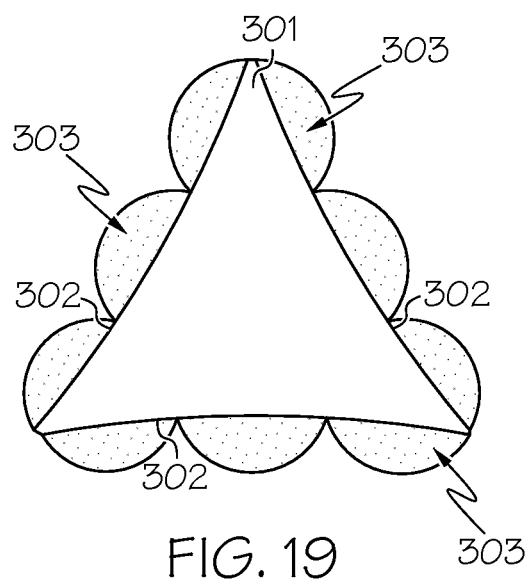
FIG. 19 schematically depicts a cross-sectional view of another example rigid segment and members for preventing movement of a deformable sensor according to one or more embodiments described and illustrated herein.

FIG. 19 illustrates another embodiment of a rigid segment 301 having concave surfaces 302 in cross-section. Compliant member 303 are positioned within the concave surfaces 302 to provide a cylindrical shape in cross-section over which a deformable sensor 150 may be disposed.

It should be understood that the members for preventing deformable sensor movement may be applied to any robot or machine, and are not limited to being applied to the robot 100 illustrated by FIGS. 1-10.

Figure 20:
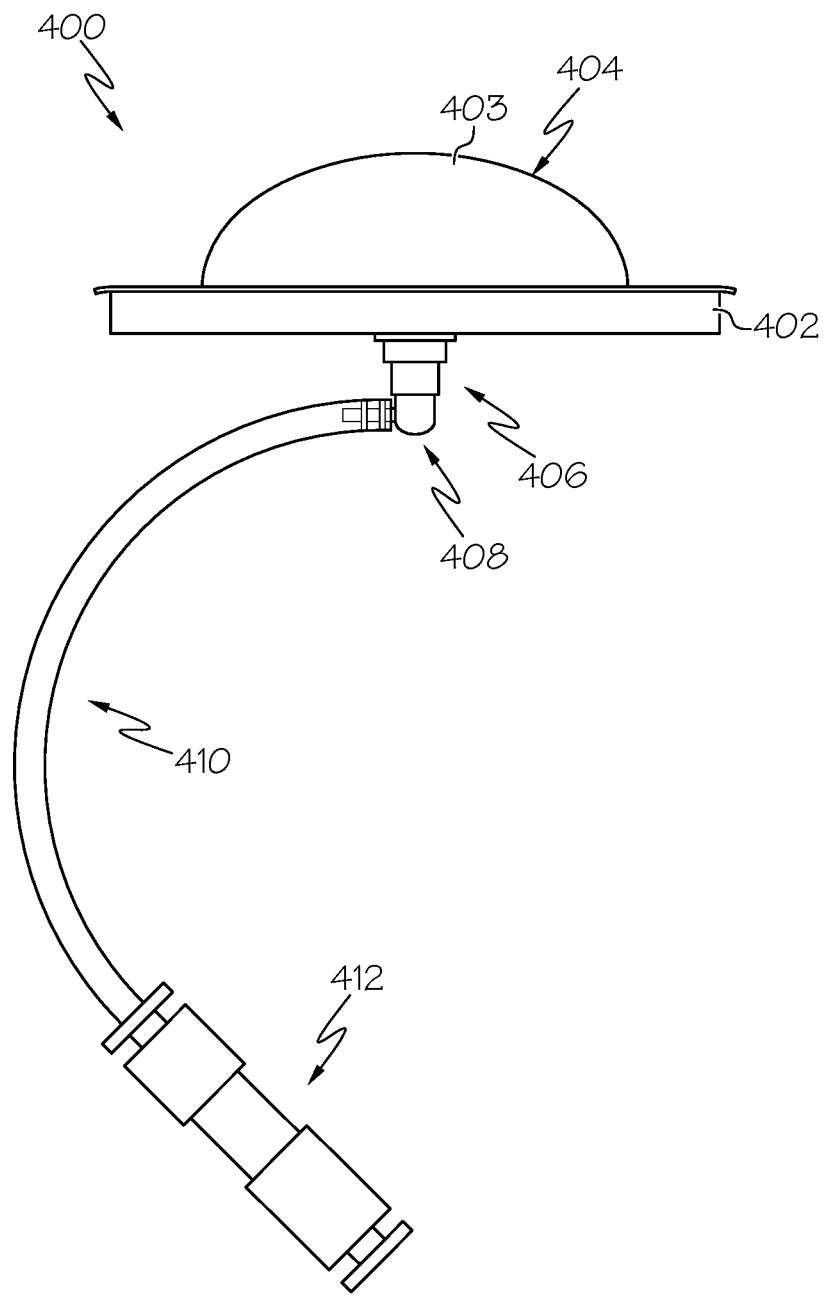
FIG. 20 schematically depicts an example pressure sensor device according to one or more embodiments described and illustrated herein.

Contact sensors other than the deformable sensors 150 described above may also be applied to the robot. Referring now to FIG. 20, an example pressure sensor device 400 that may be applied to a robot or other machine is illustrated. The pressure sensor device 400 may be provided to detect contact between an object and a robot, such as the robot 100 illustrated by FIGS. 1-10, for example.

The example pressure sensor device 400 illustrated by FIG. 20 comprises a base layer 402 and a deformable layer 404 bonded to the base layer 402 such that the base layer 402 and the deformable layer 404 define at least one inflatable chamber 403. In some embodiments, the deformable layer 404 may be bonded to the base layer 402 at their interfaces. For example, the deformable layer 404 may be heat sealed to the base layer 402 by a heat sealer such that the deformable layer 404 is bonded to the base layer 402 with no intermediate material (i.e., adhesive).

The base layer 402 may be fabricated with a rigid material, such as a thermoplastic. The deformable layer 404 is fabricated from a compliant material to enable deformation when in contact with an object. As a non-limiting example, the deformable layer 404 may be made from a thermoplastic polyurethane. The two materials for the base layer 402 and the deformable layer 404 may be chosen such that they may be bonded together by heat sealing, for example.

The pressure sensor device 400 further includes a pressure sensor (not shown in FIG. 20 and which may be similar to the pressure sensor 153 described above) that is operable to send a signal indicative of pressure within the inflatable chamber 403, which may be inflated with a gas or a fluid. In some embodiments, the pressure sensor may be disposed within the inflatable chamber 403 and communicate with a central processor of the robot by a wired or wireless communication method. In other embodiments, the pressure sensor is remote from the inflatable chamber 403. As shown in FIG. 20, the pressure sensor device 400 may include a port 406 that may be used for both inflating the inflatable chamber 403 as well as for connecting to a fitting 408 that is further fluidly coupled to tubing 410. The tubing 410 may also be fluidly coupled to a remote pressure sensor so that the pressure sensor is fluidly coupled to the inflatable chamber 403. As shown in FIG. 20, a second fitting 412 may be fluidly coupled to the tubing 410 to fluidly couple the tubing 410 to the pressure sensor.

Embodiments are not limited to embodiments where the base layer is a rigid material. In some embodiments, both the base layer and the deformable layer are deformable and/or compliant. In some embodiments, both the base layer and the deformable layer are fabricated from the same material.

Figure 21A:
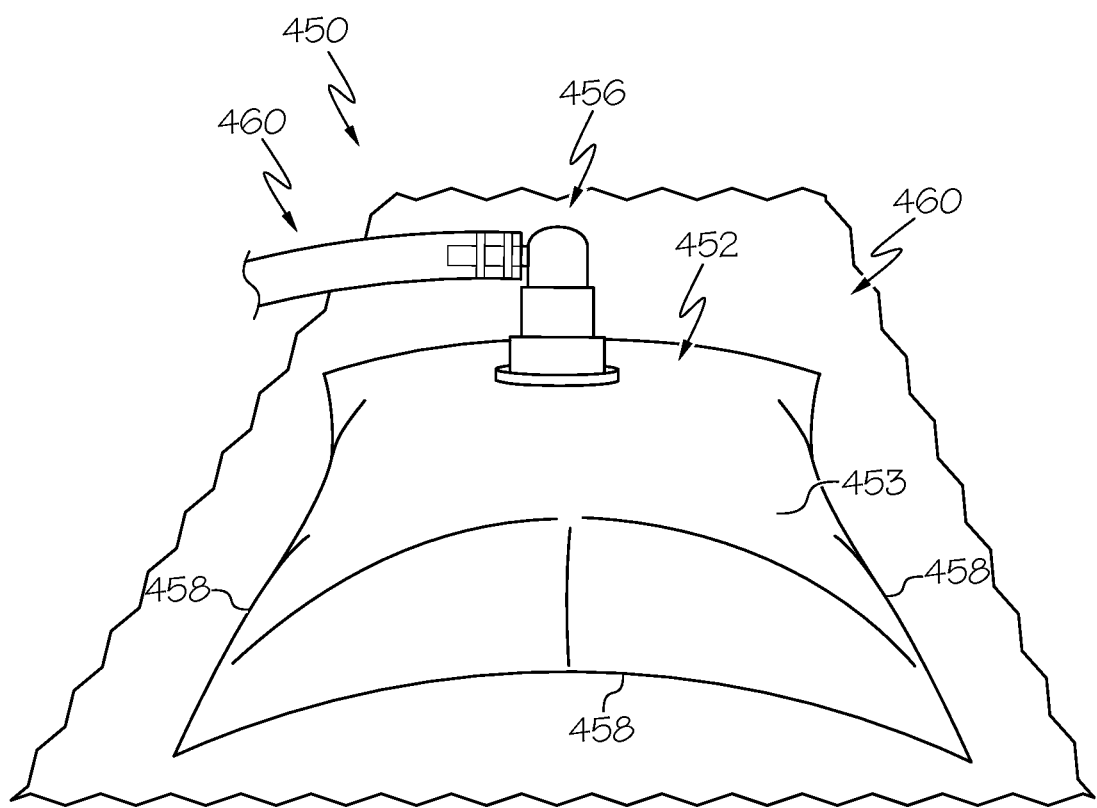
FIGS. 21A and 21B schematically depict another example pressure sensor device according to one or more embodiments described and illustrated herein.
Figure 21B:
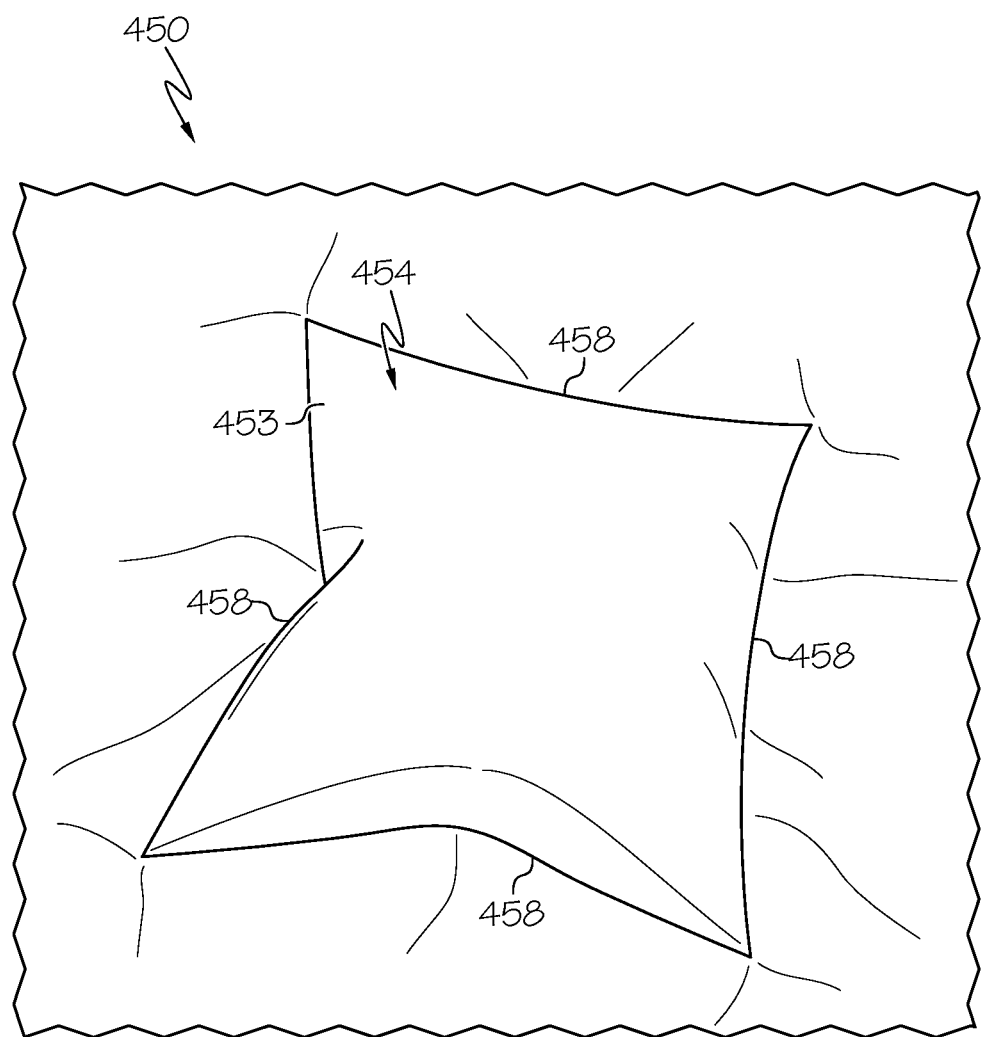

Referring to FIGS. 21A and 21B, another example pressure sensor device 450 is illustrated. FIG. 21A shows the base layer 452 while FIG. 21B shows the deformable layer 454 that is configured to contact an object. It should be understood that the base layer 452 and the deformable layer 454 may be made of the same materials or different materials. The material(s) of the base layer 452 and the deformable layer 454 may be such that that the base layer 452 and the deformable layer 454 are heat sealed to form a sealed perimeter 458 around an inflatable chamber 453. As shown in FIG. 21A, the base layer 452 may have a port 456 that is used to both inflate the inflatable chamber 453 as well as fluidly couple the inflatable chamber 453 to a pressure sensor (not shown) by tubing 460.

Figure 24:
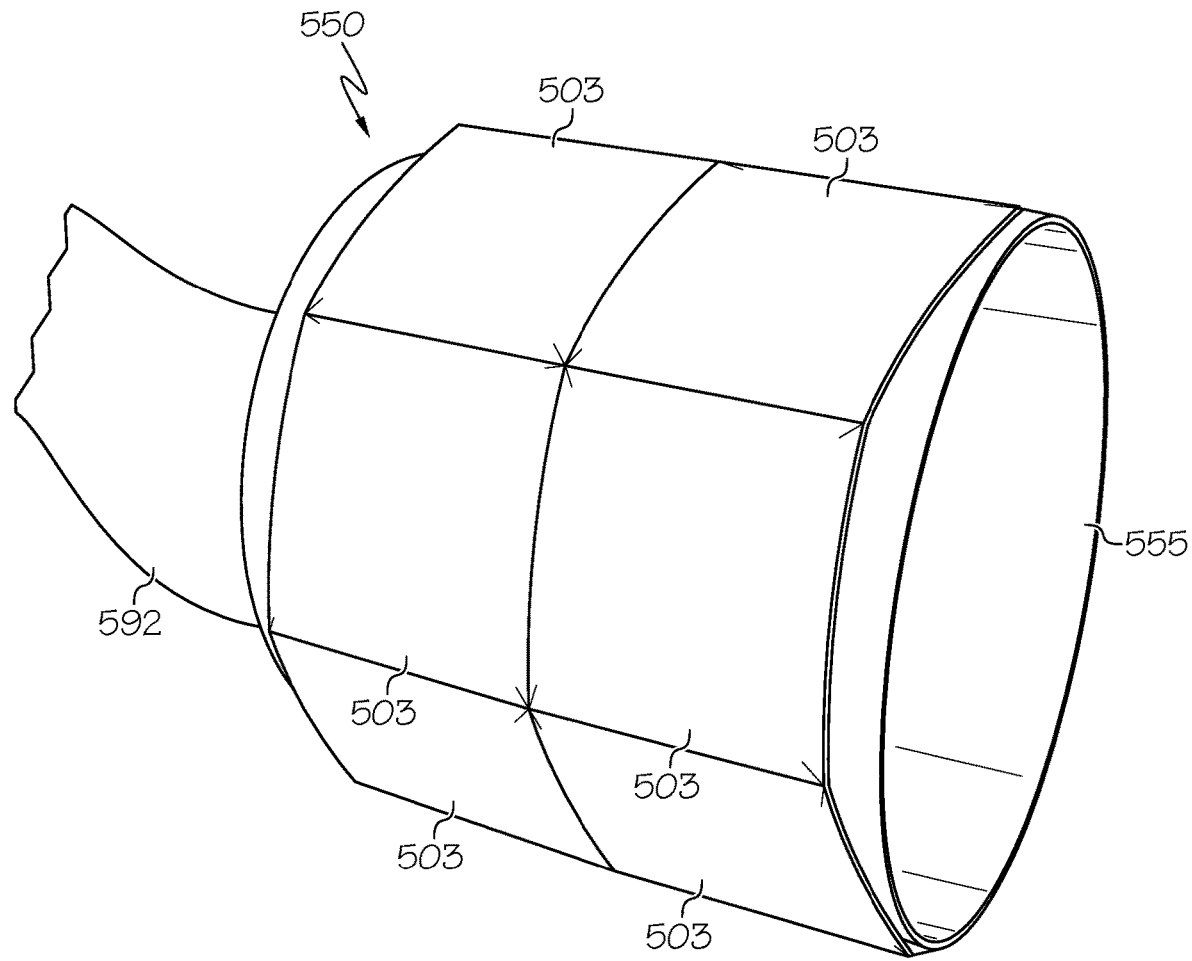
FIG. 24 schematically depicts a sensor assembly disposed on a rigid segment of a robot according to one or more embodiments described and illustrated herein.

Any number of inflatable chambers 453 may be fabricated from a single base layer 452 and a single deformable layer 454. For example, an array of inflatable chambers 453 may be formed by heat sealing. FIG. 24, which is described in more detail below, illustrates an example array of inflatable chambers in a single base layer and a single deformable layer. The plurality of inflatable chambers 453 may be arranged in an array, or may be arbitrarily arranged. Each inflatable chamber 453 has associated therewith a pressure sensor. In this manner, the plurality of inflatable chambers 453 can provide localized contact feedback regarding an object contacting the robot.

Figure 22A:
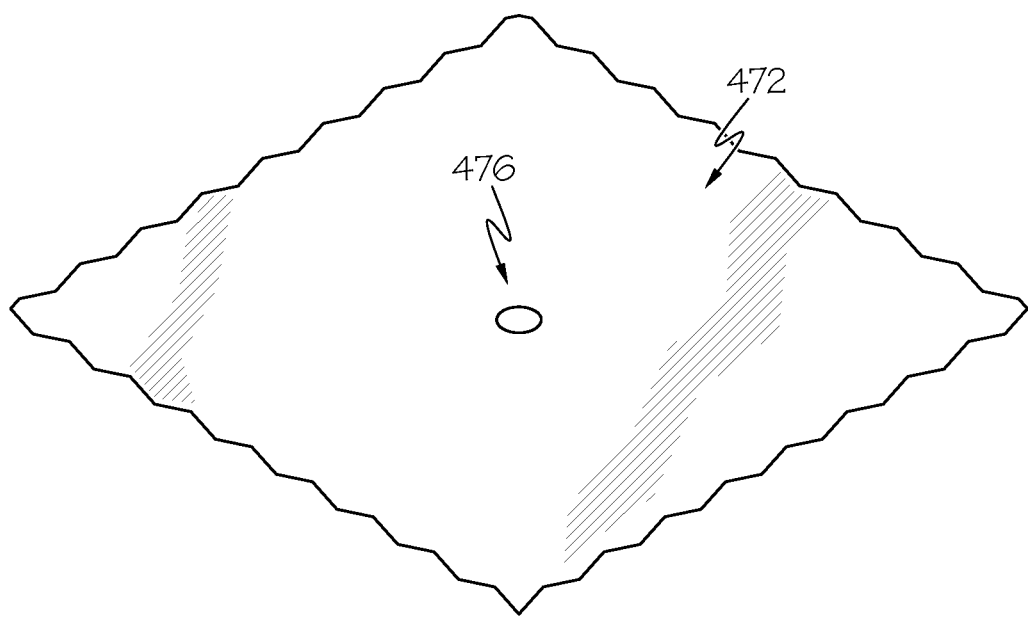
FIGS. 22A-22C schematically depict another example pressure sensor device according to one or more embodiments described and illustrated herein.
Figure 22B:
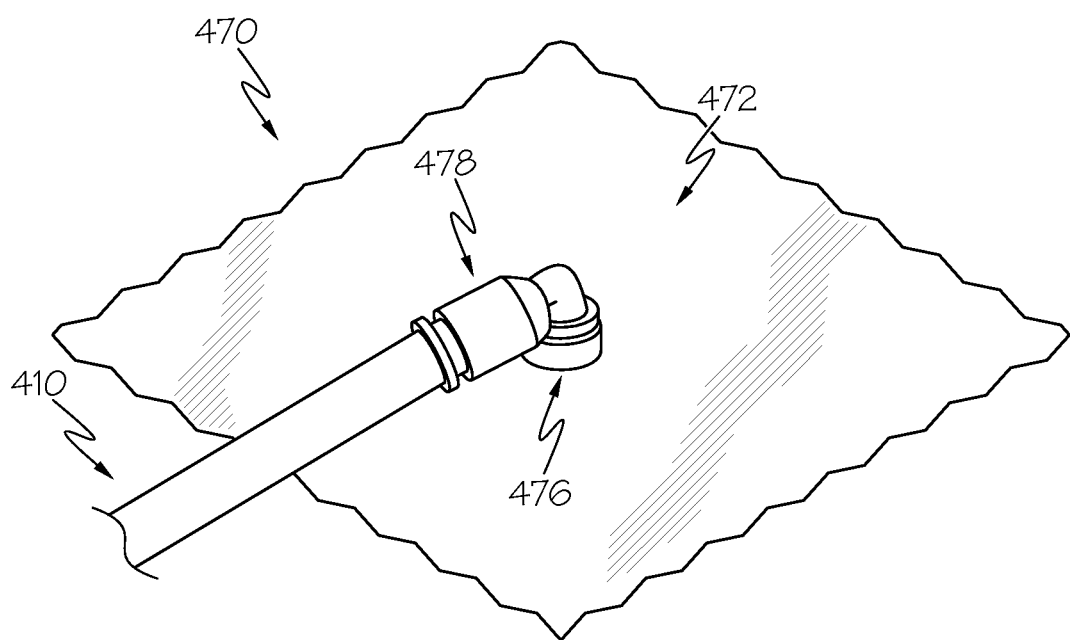
Figure 22C:
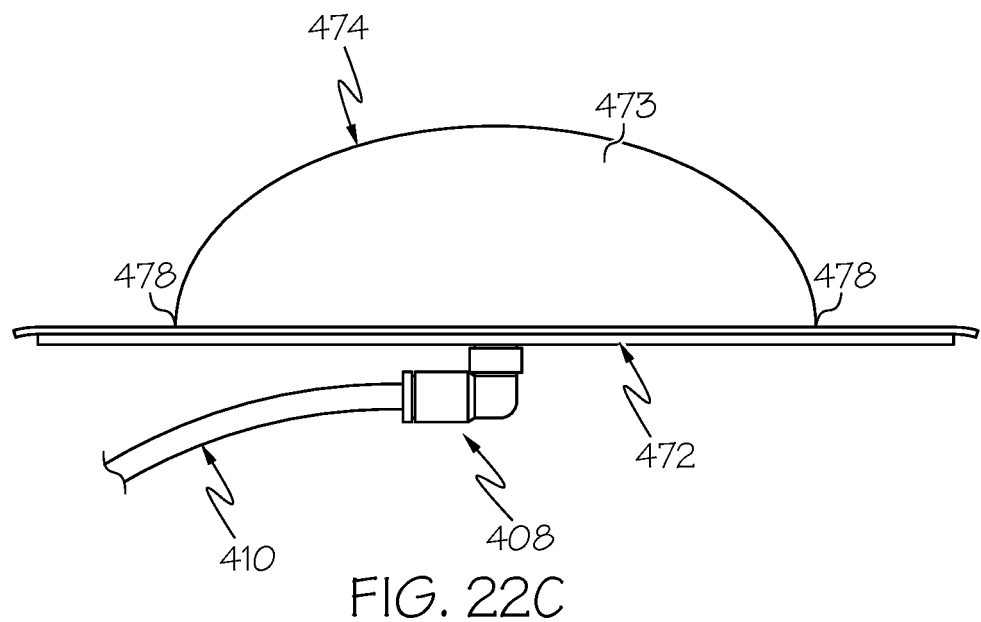

FIGS. 22A-22C illustrate another example pressure sensor device 470. FIGS. 22A and 22B illustrate a bottom surface of a base layer 472 that is fabricated from a thermoplastic resin. As a non-limiting example, the thermoplastic resin may be Worbla® sold by Cast4Art of Neuhemsbach, Germany. Worbla® may be advantageous because it is capable of being shaped/molded into a desirable shape and can also be heat-sealed to other materials, such as the deformable layer 474 (FIG. 22C). For example, the thermoplastic resin, such as Worbla®, may be shaped to the contours of the rigid segment of the robot to which it is attached.

As shown in FIG. 22A, the base layer 472 has a port 476 that is configured as a through-hole. The port 476 is then provided with a fitting 479 to be coupled to a tubing 410 that is used to both inflate an inflatable chamber 473 and fluidly couple the inflatable chamber 473 to a pressure sensor (not shown, but see pressure sensor 153 of FIG. 11).

FIG. 22C shows the inflatable chamber 473, which is defined by the base layer 472 (e.g., Worbla® or some other thermoplastic resin) and a deformable layer 474 that is fabricated from a thermoplastic polyurethane. The base layer 472 and the deformable layer 474 are bonded (e.g., heat sealed) around a perimeter 478 to define the inflatable chamber 473, which is filled with a gas or fluid.

Figure 23:
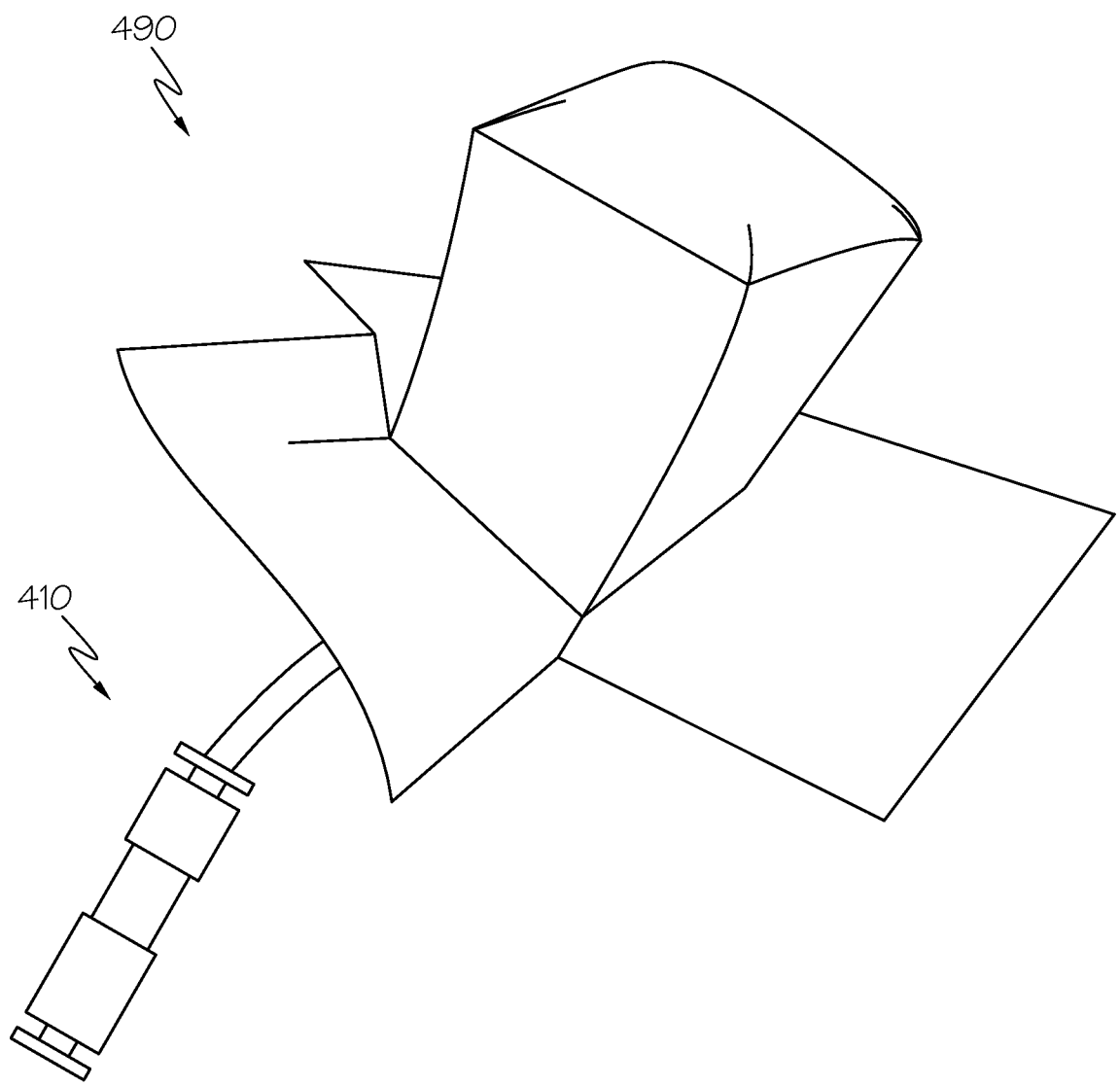
FIG. 23 schematically depicts another example pressure sensor device configured as a cube according to one or more embodiments described and illustrated herein.

The shape of the pressure sensor devices described herein are not limited to dome-shaped inflatable chambers. The pressure sensor devices described herein may take on any shape. Referring to FIG. 23, a pressure sensing device 490 having an inflatable chamber 493 shaped as a cube is illustrated. The inflatable chamber 493 is defined by cuts within a deformable layer that are made to form the cubic shape. It should be understood that other shapes are also possible.

It should be understood that the pressure sensor devices described herein may be provided on robots and/or machines other than the robot 100 illustrated by FIGS. 1-10.

As stated above, a sheet of a base layer and a deformable layer having a plurality of inflatable chambers may be used as a soft robot "skin" capable of detecting the location of contact of a robot. The skin provides both softness to the robot as well as the sense of touch. FIG. 24 illustrates an example array 500 of pressure sensor devices defined by inflatable chambers 503 that is disposed around a rigid segment 592 of a robot. The rigid segment 592 has a hollow inner chamber 555 to maintain the tubing for the individual inflatable chambers 503. Additionally, a plurality of pressure sensors (not shown) may be disposed within the inner chamber 444. The array 500 of pressure sensor devices provides a soft skin to the robot as well as provides feedback regarding contact between an object and the robot.

Figure 25:
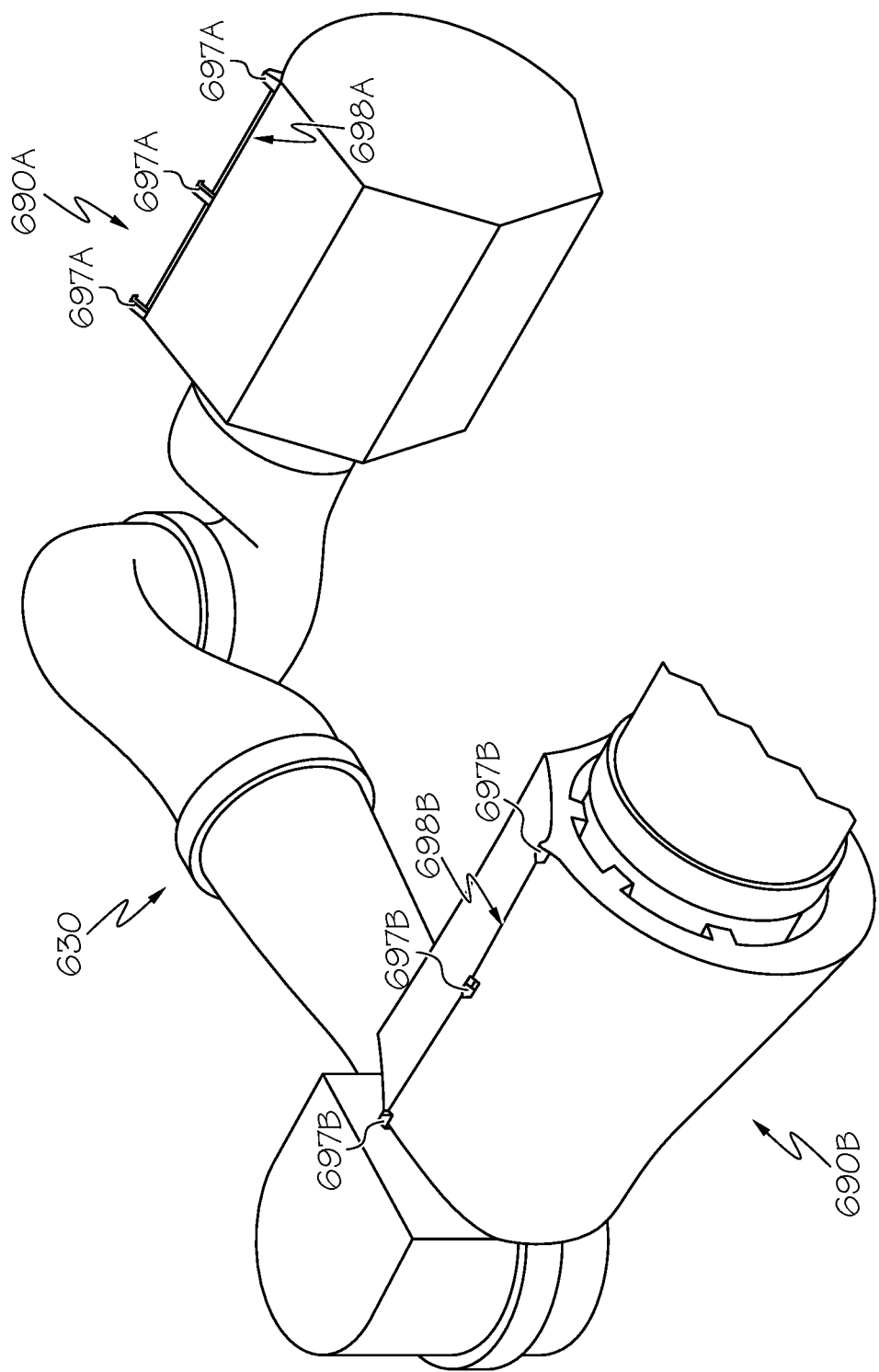
FIG. 25 schematically depicts rigid segments of a robot configured to hold soft sensor assemblies according to one or more embodiments described and illustrated herein.

In some embodiments, both the rigid segment and the array of pressure sensor devices have features that enable the array of pressure sensor devices (i.e., the robot "skin") to be attached to the rigid segment. Referring now to FIG. 25, two rigid segments 690A, 690B (also referred to herein as structures) provided on a robot arm 630 for receiving robot skins having arrays of pressure sensor devices are illustrated. Each rigid segment 690A, 690B a first set of engagement features 697A, 697B that extend from an outer surface of the rigid segment 690A, 690B at a first location 698A, 698B. Although not shown in FIG. 25, each rigid segment 690A, 690B further has a second set of engagement features that extend from the outer surface at a second location. The first location 698A, 698B is offset from the second location on each rigid segment 690A, 690B. In the illustrated embodiment, the first sets of engagement features 697A, 697B and the second sets of engagement features are configured as hooks operable to receive corresponding engagement features of a robot skin.

Referring now to FIG. 26, a first sensor assembly 550A (i.e., first array of pressure sensor devices) is shown attached to the first rigid segment 690A and a second sensor assembly 550B (i.e., a second array of pressure sensor devices) is shown attached to the second rigid segment 690B. Referring specifically to the first sensor assembly 550A, it includes a first member 559 proximate to a first edge 557 of the first sensor assembly 550A, and a second member 559' proximate to a second edge 557' of the first sensor assembly 550A. The first member 559 and the second member 559' are rigid and configured to be disposed in the first and second sets of engagement features 697A, 697A' of the first rigid segment 690A, respectively. As a non-limiting example, the first and second members 559, 559' are configured as metal rods. However, it should be understood that other rigid materials are also possible.

To attach the first sensor assembly 690A to the first rigid segment 690A, the first member 559 is disposed within the hooks as defined by the first set of engagement features 697A (FIG. 25) at the first location 698A. The first sensor assembly 690A is then pulled taut so that it is under tension. The second member 559' is then disposed within the hooks defined by the second set of engagement features at the second location 698'. The tension on the first sensor assembly 690A then holds the first sensor assembly 690A in an engagement state with the first rigid segment 690A.

It should now be understood that embodiments of the present disclosure are directed to robots and various assorted components that enable a robot to lift heavy objects with its arms and chest, as we as to soft and deformable contact sensors that provide feedback regarding object contact location.

In a first aspect, a robot includes a rail system, a body structure coupled to the rail system, a first arm coupled to a first side of the body structure, one or more first arm actuators providing the first arm with multiple degrees of freedom, a second arm coupled to a second side of the body structure, one or more second arm actuators providing the second arm with multiple degrees of freedom, a lift actuator operable to move the body structure along the rail system, and a tilt structure coupled to the body structure. The one or more first arm actuators and the one or more second arm actuators are operable to wrap the first arm and the second arm around an object and hold the object against the body structure. The tilt structure is operable to tilt the body structure in a direction away from the rail system to support the object. The lift actuator is operable to move the body structure such that the object is lifted on the rail system.

In a second aspect, a robot according to the first aspect, further including a tilt structure support member, wherein the tilt structure is coupled to the tilt structure support member at a first end and the tilt structure is coupled to a rear surface of the body structure at a second end such that the tilt structure defines an angle with respect to the tilt structure support member.

In a third aspect, a robot according to the second aspect, wherein the tilt structure comprises a pneumatic jack.

In a fourth aspect, a robot according to the second or third aspect, wherein the tilt structure is controlled such that a tilt angle of the body structure with respect to the tilt structure support member is based at least in part on a weight of the object.

In a fifth aspect, a robot according to any preceding aspect, wherein the body structure comprises one or more force sensors operable to detect a force applied to the body structure.

In a sixth aspect, a robot according to the fifth aspect, wherein the one or more force sensors comprises an array of flexible tactile sensors.

In a seventh aspect, a robot according to the sixth aspect, wherein each force sensor of the array of flexible tactile sensors is operable to detect a force magnitude and a force direction.

In an eighth aspect, a robot according to the seventh aspect, wherein each force sensor comprises a compliant layer.

In a ninth aspect, a robot according to the seventh or eighth aspect, further including a processor, wherein the processor is operable to receive one or more and, from the one or more signals, determine a geometry of the object.

In a tenth aspect, a robot according to any one of the fifth through ninth aspects, further including a friction material that covers the one or more force sensors.

In an eleventh aspect, a robot according to any preceding aspect, further including one or more compliant sensors positioned on at least one of the first arm and the second arm.

In a twelfth aspect, a robot according to the eleventh aspect, wherein the one or more compliant sensors comprises a deformable membrane.

In a thirteenth aspect, a robot according to any preceding aspect, further including one or more control members operable to be grasped by a user such that the user may move the robot.

In a fourteenth aspect, a robot includes a rail system, a body structure coupled to the rail system, the body structure having one or more force sensors operable to detect a force applied to the body structure, a first arm coupled to a first side of the body structure, a plurality of first arm actuators providing the first arm with multiple degrees of freedom, a second arm coupled to a second side of the body structure, a plurality of second arm actuators providing the second arm with multiple degrees of freedom, a lift actuator operable to move the body structure along the rail system, and a tilt structure coupled to the body structure. The plurality of first arm actuators and the plurality of second arm actuators are operable to wrap the first arm and the second arm around an object and hold the object against the body structure. The tilt structure is operable to tilt the body structure in a direction away from the rail system to support the object. The lift actuator is operable to move the body structure such that the object is lifted on the rail system.

In a fifteenth aspect, a robot according to the fourteenth aspect, further including a tilt structure support member, wherein the tilt structure is coupled to the tilt structure support member at a first end and the tilt structure is coupled to a rear surface of the body structure at a second end such that the tilt structure defines an angle with respect to the tilt structure support member.

In a sixteenth aspect, a robot according to the fifteenth aspect, wherein the tilt structure is a pneumatic jack.

In a seventeenth aspect, a robot according to the fifteenth aspect or the fourteenth aspect, wherein the tilt structure is controlled such that a tilt angle of the body structure with respect to the tilt structure support member is based at least in part on a weight of the object.

In an eighteenth aspect, a robot according to any one of the fourteenth through seventeenth aspects, wherein the one or more force sensors comprises an array of flexible tactile sensors.

In a nineteenth aspect, a robot according to the eighteenth aspect, wherein each force sensor of the array of flexible tactile sensors is operable to detect a force magnitude and a force direction.

In a twentieth aspect, a robot according to the nineteenth aspect, wherein each force sensor comprises a compliant layer.

In a twenty-first aspect, a sensor assembly includes a compliant substrate assembly having a base layer, and a deformable layer heat-sealed to the base layer such that the base layer and the deformable layer define at least one inflatable chamber. The sensor assembly further includes a first member proximate to a first edge of the compliant substrate assembly, a second member proximate to a second edge of the compliant substrate assembly, wherein the second edge is opposite the first edge, and at least one pressure sensor fluidly coupled to the at least one inflatable chamber and operable to produce a signal indicative of a pressure within the at least one inflatable chamber.

In a twenty-second aspect, a sensor assembly according to the twenty-first aspect, wherein the at least one inflatable chamber is operable to be filled with a gas.

In a twenty-third aspect, a sensor assembly according to the twenty-second aspect, further including a tubing that fluidly couples the at least one inflatable chamber to the at least one pressure sensor.

In a twenty-fourth aspect, a sensor assembly according to any one of the twenty-first through twenty-third aspect, wherein the base layer is fabricated from a first material and the deformable layer is fabricated from a second material that is different from the first material.

In a twenty-fifth aspect, a sensor assembly according to any one of the twenty-first through twenty-third aspects, wherein the at least one inflatable chamber comprises an array of inflatable chambers.

In a twenty-sixth aspect, a sensor assembly according to the twenty-fifth aspect, wherein the at least one pressure sensor comprises a plurality of pressure sensors fluidly coupled to the array of inflatable chambers.

In a twenty-seventh aspect, a sensor assembly according to any one of the twenty-first through twenty-sixth aspects, wherein the first member and the second member are rods.

In a twenty-eighth aspect, a structure for receiving a compliant substrate assembly includes an outer surface, a first set of engagement features extending from a first location of the outer surface, wherein the first set of engagement features are configured to receive a first member of the compliant substrate assembly, and a second set of engagement features extending from a second location of the outer surface that is offset from the first location by a distance, wherein the second set of engagement features are configured to receive a second member of the compliant substrate assembly.

In a twenty-ninth aspect, a structure according to the twenty-eighth aspect, wherein the distance is greater than a length of the compliant substrate assembly as measured from the first member to the second member.

In thirtieth aspect, a structure according to the twenty-eighth aspect or the twenty-ninth aspect, wherein the first set of engagement features comprises two or more first hooks and the second set of engagement features comprises two or more second hooks.

In a thirty first aspect, a structure according to any one of the twenty eighth through thirtieth aspects, wherein the structure is at least a portion of a robot arm.

In a thirty second aspect, a sensor assembly includes a base structure including an outer surface, a first set of engagement features extending from a first location of the outer surface, and a second set of engagement features extending from a second location of the outer surface that is offset from the first location by a distance. The sensor assembly further includes a compliant substrate assembly including a base layer, a deformable layer heat-sealed to the base layer such that the base layer and the deformable layer define at least one inflatable chamber, a first member proximate to a first edge of the compliant substrate assembly, wherein the first member is held by the first set of engagement features, and a second member proximate to a second edge of the compliant substrate assembly, wherein the second edge is opposite the first edge and the second member is held by the second set of engagement features such that the compliant substrate assembly is stretched over at least a portion of the base structure. The sensor assembly further includes at least one pressure sensor fluidly coupled to the at least one inflatable chamber and operable to produce a signal indicative of a pressure within the at least one inflatable chamber.

In a thirty third aspect, a sensor assembly according to the thirty second aspect, wherein the at least one inflatable chamber is operable to be filled with a gas.

In a thirty fourth aspect, a sensor assembly according to the thirty third aspect, further including a tubing that fluidly couples the at least one inflatable chamber to the at least one pressure sensor.

In a thirty fifth aspect, a sensor assembly according to any one of the thirty second through thirty fourth aspects, wherein the base layer is fabricated from a first material and the deformable layer is fabricated from a second material that is different from the first material.

In a thirty-sixth aspect, a sensor assembly according to any one of the thirty second through thirty fifth aspects, wherein the at least one inflatable chamber comprises an array of inflatable chambers.

In a thirty seventh aspect, a sensor assembly according to the thirty-sixth aspect, wherein the at least one pressure sensor comprises a plurality of pressure sensors fluidly coupled to the array of inflatable chambers.

The thirty eighth aspect, a sensor assembly according to any one of the thirty second through thirty seventh aspects, wherein the first member and the second member are rods.

In the thirty ninth aspect, a sensor assembly according to any one of the thirty second through thirty eighth aspects, wherein the distance is greater than a length of the compliant substrate assembly as measured from the first member to the second member.

In a fortieth aspect, a sensor assembly according to any one of the thirty second through thirty ninth aspects, wherein the first set of engagement features comprises two or more first hooks and the second set of engagement features comprises two or more second hooks.

In a forty first aspect, a pressure sensor device includes a base layer, a deformable layer bonded to the base layer such that the base layer and the deformable layer define at least one inflatable chamber, and at least one pressure sensor fluidly coupled to the at least one inflatable chamber and operable to produce a signal indicative of a pressure within the at least one inflatable chamber.

In forty second aspect, the pressure sensor according to the forty first aspect, wherein the at least one inflatable chamber is operable to be filled with a gas.

In a forty third aspect, a pressure sensor according to the forty second aspect, further including a tubing that fluidly couples the at least one inflatable chamber to the at least one pressure sensor.

In a forty fourth aspect, a pressure sensor according to any one of the forty first through forty third aspects, wherein the deformable layer defines a dome shape when the at least one inflatable chamber is filled with a gas.

In a forty fifth aspect, a pressure sensor according to any one of the forty first through forty fourth aspects, wherein the deformable layer defines a cubic shape when the at least one inflatable chamber is filled with a gas.

In a forty sixth aspect, a pressure sensor according to any one of the forty first 340 fifth aspects, wherein the base layer is fabricated from a first material and the deformable layer is fabricated from a second material that is different from the first material.

In a forty seventh aspect, a pressure sensor according to the forty sixth aspect, wherein the first material is a thermoplastic resin and the second material is a thermoplastic polyurethane material.

In a forty eighth aspect, a pressure sensor according to the forty-six aspect or the forty seventh aspect, wherein the first material is an acrylic material and the second material is a thermoplastic polyurethane material.

In a forty ninth aspect, a pressure sensor according to one of the forty first through forty eighth aspects, wherein the at least one inflatable chamber comprises an array of inflatable chambers.

In a fiftieth aspect, a pressure sensor according to the forty ninth aspect, wherein the at least one pressure sensor comprises a plurality of pressure sensors fluidly coupled to the array of inflatable chambers.

In a fiftieth first aspect, a robot includes a component having a surface and a pressure sensor device coupled to the surface, the pressure sensor device including a base layer, a deformable layer bonded to the base layer such that the base layer and the deformable layer define at least one inflatable chamber, and at least one pressure sensor fluidly coupled to the at least one inflatable chamber and operable to produce a signal indicative of a pressure within the at least one inflatable chamber.

In a fifty second aspect, a robot according to the fifty first aspect, wherein the surface includes an arm.

In a fifty third aspect, a robot according to any one of the fifty first or fifty second aspects, further comprising a tubing that fluidly couples the at least one inflatable chamber to the at least one pressure sensor.

In a fifty fourth aspect, a robot according to any one of the fifty first through fifty third aspects, wherein the deformable layer defines a dome shape when the at least one inflatable chamber is filled with a gas.

In the fifty fifth aspect, a robot according to any one of the fifty first through fifty third aspects, wherein the deformable layer defines a cubic shape when the at least one inflatable chamber is filled with a gas.

In a fifty sixth aspect, a robot according to any one of the fifty first through fifty fifth aspects, wherein the base layer is fabricated from a first material and the deformable layer is fabricated from a second material that is different from the first material.

In a fifty seventh aspect, a robot according to the fifty sixth aspect, wherein the first material is a thermoplastic resin and the second material is a thermoplastic polyurethane material.

In a fifty eighth aspect, a robot according to the fifty sixth aspect, wherein the first material is an acrylic material and the second material is a thermoplastic polyurethane material.

In a fifty ninth aspect, a robot according to any one of the fifty first through fifty eighth aspects, wherein the at least one inflatable chamber comprises an array of inflatable chambers.

In a sixtieth aspect, a robot according to the fifty ninth aspect, wherein the at least one pressure sensor comprises a plurality of pressure sensors fluidly coupled to the array of inflatable chambers.

In a sixty first aspect, a robot includes a rail system extending in a system direction, a body structure coupled to the rail system, the body structure comprising an array of flexible tactile sensors, wherein each flexible tactile sensor of the array of flexible tactile sensors is operable to produce a signal determinative of a magnitude and a direction of a force applied to the flexible tactile sensor, and a lift actuator operable to move the body structure along the rail system.

In a sixty second aspect, robot according to the sixty first aspect, further including a processor, wherein the processor is operable to receive one or more signals from the array of flexible tactile sensors and, from the one or more signals, determine a geometry of an object pressed against the array of flexible tactile sensors.

In a sixty third aspect, a robot according to the sixty first or sixty second aspect, further including a friction material that covers the array of flexible tactile sensors.

In a sixty fourth aspect, a robot according to any one of the sixty first through sixty third aspects, wherein the body structure further comprises an arcuate base and the array of flexible tactile sensors are coupled to the arcuate base.

In a sixty fifth aspect, a robot according to any one of the sixty first through the sixty fourth aspects, wherein each tactile sensor of the array of flexible tactile sensors includes a conductive target positioned in a first plane, at least three coils forming an array within a second plane, the second plane spaced apart from the first plane, a pliable material disposed between the conductive target and the at least three coils, and an electronic device electrically coupled to each of the at least three coils, the electronic device configured to induce an AC signal within each of the at least three coils and measure a change in inductance in the at least three coils in response to movement of the conductive target.

In a sixty sixth aspect, a robot according to any one of the sixty first through sixty fifth aspects, further including a first arm coupled to a first side of the body structure, one or more first arm actuators providing the first arm with multiple degrees of freedom, a second arm coupled to a second side of the body structure, and one or more second arm actuators providing the second arm with multiple degrees of freedom, wherein the one or more first arm actuators and the one or more second arm actuators are operable to wrap the first arm and the second arm around an object and hold the object against the body structure.

In a sixty-seventh aspect, a robot according to the sixty sixth aspect, wherein each of the one or more first arm actuators and the one or more second arm actuators includes a shoulder actuator that couples the first arm and the second arm to the body structure, an elbow actuator, and a wrist actuator.

In a sixtieth aspect, a robot according to the sixty sixth aspect, further including one or more deformable sensors positioned on at least one of the first arm and the second arm.

In a sixty ninth aspect, a robot according to the sixty eighth aspect, wherein the one or more deformable sensors comprises a deformable membrane.

In a seventieth aspect, a robot according to any one of the sixty first through sixty ninth aspects, further including a tilt structure coupled to the body structure, wherein the tilt structure is operable to tilt the body structure in a direction away from the rail system to support an object.

In a seventy first aspect, a robot includes a rail system extending in a system direction and a body structure coupled to the rail system, the body structure comprising an array of flexible tactile sensors. Each flexible tactile sensor of the array of flexible tactile sensors include a conductive target positioned in a first plane, at least three coils forming an array within a second plane, the second plane spaced apart from the first plane, a pliable material disposed between the conductive target and the at least three coils, and an electronic device electrically coupled to each of the at least three coils, the electronic device configured to induce an AC signal within each of the at least three coils and measure a change in inductance in the at least three coils in response to movement of the conductive target. The robot further includes a first arm coupled to a first side of the body structure, a second arm coupled to a second side of the body structure, and a lift actuator operable to move the body structure along the rail system.

In a seventy second aspect, a robot according to the seventy first aspect, further including a processor, wherein the processor is operable to receive one or more signals from the array of flexible tactile sensors and, from the one or more signals, determine a geometry of an object pressed against the array of flexible tactile sensors.

In a seventy third aspect, a robot according to the seventy first aspect or the seventy second aspect, further including a friction material that covers the array of flexible tactile sensors.

In a seventy fourth aspect, a robot according to any one of the seventy first through seventy third aspects, wherein the body structure further comprises an arcuate base and the array of flexible tactile sensors are coupled to the arcuate base.

In a seventy fifth aspect, a robot according to any one of the seventy first through seventy fourth aspects, further including one or more first arm actuators providing the first arm with multiple degrees of freedom, and one or more second arm actuators providing the second arm with multiple degrees of freedom. The one or more first arm actuators and the one or more second arm actuators are operable to wrap the first arm and the second arm around an object and hold the object against the body structure.

In a seventy-six aspect, a robot according to the seventy fifth aspect, wherein each of the one or more first arm actuators and the one or more second arm actuators includes a shoulder actuator that couples the first arm and the second arm to the body structure, an elbow actuator, and a wrist actuator.

In a seventy seventh aspect, a robot according to any one of the seventy first through seventy sixth aspects, further including a tilt structure coupled to the body structure, wherein the tilt structure is operable to tilt the body structure in a direction away from the rail system to support an object.

In a seventy eighth aspect, a robot according to any one of the seventy first through seventy seventh aspects, further including one or more deformable sensors positioned on at least one of the first arm and the second arm.

In a seventy ninth aspect, a robot according to the seventy eighth aspect, wherein the one or more deformable sensors comprises a deformable membrane.

In an eightieth aspect, a robot according to any one of the seventy first through seventy ninth aspects, further including one or more deformable sensors positioned on at least one of the first arm and the second arm.

In an eighty first aspect, a sensor device includes an inflatable diaphragm operable to be disposed on a member, and an array of force sensors disposed about the inflatable diaphragm, wherein the array of force sensors provides one or more signals indicative of a location of contact between an object and the inflatable diaphragm.

In an eighty second aspect, a sensor device according to the eighty first aspect, wherein the array of force sensors are operable to be disposed on a surface of the member such that the array of force sensors contacts the inner surface of the inflatable diaphragm.

In an eighty third aspect, a sensor device according to the eighty first aspect or the eighty second aspect, further including a sensor housing, wherein the array of force sensors is disposed within the sensor housing.

In an eighty fourth aspect, a sensor device according to any one of the eighty first through eighty third aspects, wherein the array of force sensors comprises a plurality of linear force resistors.

In an eighty fifth aspect, a sensor device according to the eighty fourth aspect, wherein each linear force resistor comprises a carbon-doped linear potentiometer.

In an eighty sixth aspect, a sensor device according to any one of the eighty first through eighty fifth aspects, wherein the array of force sensors comprises a plurality of individual force sensors.

In an eighty seventh aspect, a sensor device according to any one of the eighty first through eighty sixth aspects, wherein one or more force sensors of the array of force sensors comprises a force concentrator.

In the eighty eighth aspect, a sensor device according to any one of the eighty first through eighty seventh aspects, wherein the inflatable diaphragm further includes a port, and the sensor device further includes a pressure sensor and tubing, wherein the tubing fluidly couples the port to the pressure sensor.

In an eighty ninth aspect, a sensor device according to any one of the eighty first through eighty eighth aspects, further including an outer cover layer disposed around the inflatable diaphragm, wherein the outer cover layer is fabricated from a material having a strength of greater than or equal to 35 cN/dtex.

In a ninetieth aspect, a sensor device according to the eighty ninth aspect, wherein the outer cover layer further includes one or more additional materials comprising one or more of an electrically conductive material and a friction material having a coefficient of friction that is greater than a coefficient of friction of the material.

In a ninety first aspect, a robot includes at least one member, and a sensor device including an inflatable diaphragm disposed on the at least one member and an array of force sensors disposed about the inflatable diaphragm, wherein the array of force sensors provides one or more signals indicative of a location of contact between an object and the inflatable diaphragm.

In a ninety second aspect, a robot according to the ninety first aspect, wherein the array of force sensors are disposed on a surface of the at least one member such that the array of force sensors contacts the inner surface of the inflatable diaphragm.

In a ninety third aspect, a robot according to the ninety first aspect or the ninety second aspect, wherein the sensor device further includes a sensor housing, wherein the array of force sensors is disposed within the sensor housing.

In the ninety fourth aspect, a robot according to any one of the ninety first through ninety third aspects, wherein the array of force sensors includes a plurality of linear force resistors.

In a ninety fifth aspect, a robot according to the ninety fourth aspect, wherein each linear force resistor comprises a carbon-doped linear potentiometer.

In a ninety sixth aspect, a robot according to any one of the ninety first through ninety fifth aspects, wherein the array of force sensors includes a plurality of individual force sensors.

In a ninety seventh aspect, a robot according to any one of the ninety first through ninety-sixth aspects, wherein one or more force sensors of the array of force sensors includes a force concentrator.

In a ninety eighth aspect, a robot according to any one of the ninety first through ninety seventh aspects, wherein the inflatable diaphragm further includes a port, and the sensor device further includes a pressure sensor and tubing, wherein the tubing fluidly couples the port to the pressure sensor.

In a ninety ninth aspect, a robot according to any one of the ninety first through ninety eighth aspects, further including an outer cover layer disposed around the inflatable diaphragm, wherein the outer cover layer is fabricated from a material having a strength of greater than or equal to 35 cN/dtex.

In a one hundredth aspect, a robot according to any one of the ninety first through ninety ninth aspects, further including one or more compliant members disposed between a surface of the at least one member and the inflatable diaphragm.

In a one hundred and first aspect, a sensor includes an inflatable diaphragm operable to be disposed on a member, wherein the inflatable diaphragm includes a port. The sensor further includes an outer cover layer disposed around the inflatable diaphragm, wherein the outer cover layer is fabricated from a material having a strength of greater than or equal to 35 cN/dtex, and a pressure sensor fluidly coupled to the port and operable to detect a pressure within the inflatable diaphragm.

In a one hundred and second aspect, a sensor according to the one hundred and first aspect, wherein the material of the outer cover layer is ultra-high molecular weight polyethylene.

In a one hundred and third aspect, a sensor according to the one hundred and first aspect or the one hundred and second aspect, wherein the material of the outer cover layer is poly-paraphenylene terephthalamide.

In a one hundred and fourth aspect, a sensor according to its any one of the one hundred and first through one hundred and third aspects, wherein the outer cover layer is further fabricated from a second material having a coefficient of friction that is greater than a coefficient of friction of the material.

In a one hundred and fifth aspect, a sensor according to the one hundred and fourth aspect, wherein the material and the second material are woven to fabricate the outer cover layer.

In a one hundred and sixth aspect, a sensor according to any one of the one hundred and first through one hundred and fifth aspects, wherein the outer cover layer is further fabricated from a second material that is electrically conductive.

In a one hundred and seventh aspect, a sensor according to any one of the one hundred and first through one hundred and sixth aspects, further including tubing that fluidly couples the pressure sensor to the port.

In a one hundred and eighth aspect, a robot component including a member and one or more deformable sensors including an inflatable diaphragm disposed on the member, the inflatable diaphragm comprising a port, an outer cover layer disposed around the inflatable diaphragm, wherein the outer cover layer is fabricated from a material having a strength of greater than or equal to 35 cN/dtex, and a pressure sensor fluidly coupled to the port and operable to detect a pressure within the inflatable diaphragm.

In a one hundred and ninth aspect, a robot according to the one hundred and eighth aspect, wherein the material of the outer cover layer is ultra-high molecular weight polyethylene.

In a one hundred and tenth aspect, a robot according to the one hundred and eighth aspect, wherein the material of the outer cover layer is poly-paraphenylene terephthalamide.

In a one hundred and eleventh aspect, a robot according to the one hundred and eighth aspect, wherein the outer cover layer is further fabricated from a second material having a coefficient of friction that is greater than a coefficient of friction of the material.

In a one hundred and twelfth aspect, a robot according to the one hundred and eleventh aspect, wherein the material and the second material are woven to fabricate the outer cover layer.

In a one hundred and thirteenth aspect, a robot according to any one of the one hundred and eighth through one hundred and twelfth aspects, wherein the outer cover layer is further fabricated from a second material that is electrically conductive.

In a one hundred and fourteenth aspect, a robot according to any one of the one hundred and eighth through one hundred and thirteenth aspects, wherein the member comprises a robot arm.

In a one hundred and fifteenth aspect, a robot including a rail system, a body structure coupled to the rail system, a first arm coupled to a first side of the body structure, one or more first arm actuators providing the first arm with multiple degrees of freedom, a second arm coupled to a second side of the body structure, one or more second arm actuators providing the second arm with multiple degrees of freedom, one or more deformable sensors disposed on one or more of the first arm and the second arm. The one or more deformable sensors includes an inflatable diaphragm having a port, an outer cover layer disposed around the inflatable diaphragm, wherein the outer cover layer is fabricated from a material having a strength of greater than or equal to 35 cN/dtex, and a pressure sensor fluidly coupled to the port and operable to detect a pressure within the inflatable diaphragm. The robot further includes a lift actuator operable to move the body structure along the rail system. The one or more first arm actuators and the one or more second arm actuators are operable to wrap the first arm and the second arm around an object and hold the object against the body structure. The lift actuator is operable to move the body structure such that the object is lifted on the rail system.

In a one hundred and sixteenth aspect, a robot according to the one hundred and fifteenth aspect, wherein the material of the outer cover layer is ultra-high molecular weight polyethylene.

In a one hundred and seventeenth aspect, a robot according to the one hundred and fifteenth aspect, wherein the material of the outer cover layer is poly-paraphenylene terephthalamide.

In a one hundred and eighteenth aspect, a robot according to the one hundred and fifteenth aspect, wherein the outer cover layer is further fabricated from a second material having a coefficient of friction that is greater than a coefficient of friction of the material.

One hundred and nineteenth aspect, a robot according to the one hundred and eighteenth aspect, wherein the material and the second material are woven to fabricate the outer cover layer.

In a one hundred and twentieth aspect, a robot according to any one of the one hundred and fifteenth through one hundred and nineteenth aspects, wherein the outer cover layer is further fabricated from a second material that is electrically conductive.

In a one hundred and twenty first aspect, a robot including a rigid surface, one or more compliant members attached to the rigid surface, and a sensor device. The sensor device includes an inflatable diaphragm operable to be disposed around the one or more compliant members, the inflatable diaphragm having a port, and a pressure sensor fluidly coupled to the port and operable to detect a pressure within the inflatable diaphragm. The one or more compliant members has a coefficient of friction with respect to the sensor device that is greater than a coefficient of friction between the sensor device and the rigid surface.

In a one hundred and twenty second aspect, a robot according to the hundred and twenty first aspect, further including an arm, and the rigid surface is on the arm.

In a one hundred and twenty third aspect, a robot according to the one hundred and twenty first aspect or the one hundred and twenty second aspect, wherein the one or more compliant members comprises a foam layer and a friction tape.

In a one hundred and twenty fourth aspect, a robot according to any one of the one hundred and twenty first through one hundred and twenty third aspects, wherein the inflatable diaphragm defines an interior contour, and the one or more compliant members define a surface that corresponds to the interior contour.

In a one hundred and twenty fifth aspect, a robot according to any one of the one hundred and twenty first through one hundred and twenty fourth aspects, wherein the one or more compliant members comprises a first compliant member having a non-uniform thickness, a second compliant member having a non-uniform thickness.

In a one hundred and twenty sixth aspect, a robot according to the one hundred and twenty fifth aspect, wherein the one or more compliant members further comprises a third compliant member having a uniform thickness and a fourth compliant member having a uniform thickness.

In a one hundred and twenty seventh aspect, a robot according to the one hundred and twenty sixth aspect, wherein the one or more compliant members are arranged on the rigid surface such that the first compliant member and the second compliant member are opposite from one another and the third compliant member and the fourth compliant member are opposite from one another.

In a one hundred and twenty eighth aspect, a robot according to any one of the one hundred and twenty first through one hundred and twenty seventh aspects, wherein the sensor device further includes an array of force sensors disposed on at least one of an inner surface of the inflatable diaphragm and an outer surface of the inflatable diaphragm, wherein the array of force sensors provides one or more signals indicative of a location of contact between an object and the inflatable diaphragm.

In a one hundred and twenty ninth aspect, a robot according to the one hundred and twenty eighth aspect, wherein the array of force sensors are disposed on a surface of the one or more compliant members such that the array of force sensors contacts the inner surface of the inflatable diaphragm.

In a one hundred and thirtieth aspect, a robot according to the one hundred and twenty ninth aspect, wherein the sensor device further includes a sensor housing, wherein the array of force sensors is disposed within the sensor housing.

Anyone hundred and thirty first aspect, a robot according to any one of the one hundred and twenty first through one hundred and thirtieth aspects, wherein the sensor device further includes an outer cover layer disposed around the inflatable diaphragm, wherein the outer cover layer is fabricated from a material having a strength of greater than or equal to 35 cN/dtex.

In a one hundred and thirty second aspect, a robot according to the one hundred and thirty first aspect, wherein the material of the outer cover layer is ultra-high molecular weight polyethylene.

In a one hundred and thirty third aspect, a sensor system includes one or more compliant members operably to be attached to a rigid surface and a sensor device. The sensor device includes an inflatable diaphragm operable to be disposed around the one or more compliant members, the inflatable diaphragm having a port, and a pressure sensor fluidly coupled to the port and operable to detect a pressure within the inflatable diaphragm. The one or more compliant members has a coefficient of friction with respect to the sensor device that is greater than a coefficient of friction between the sensor device and the rigid surface.

In a one hundred and thirty fourth aspect, a sensor system according to the one hundred and thirty third aspect, wherein the one or more compliant members includes a foam layer and a friction tape.

In a one hundred and thirty fifth aspect, a sensor system according to the one hundred and thirty third aspect or the one hundred and thirty fourth aspect, wherein the inflatable diaphragm defines an interior contour, and the one or more compliant members define a surface that corresponds to the interior contour.

In a one hundred and thirty sixth aspect, a sensor system according to any one of the one hundred and thirty third through one hundred and thirty fifth aspects, wherein the one or more compliant members includes a first compliant member having a non-uniform thickness, a second compliant member having a non-uniform thickness.

In a one hundred and thirty seventh aspect, a sensor system, according to the one hundred and thirty sixth aspect, wherein the one or more compliant members further includes a third compliant member having a uniform thickness and a fourth compliant member having a uniform thickness.

In a one hundred and thirty eighth aspect, a sensor system according to the one hundred and thirty seventh aspect, wherein the one or more compliant members are arranged on the rigid surface such that the first compliant member and the second compliant member are opposite from one another and the third compliant member and the fourth compliant member are opposite from one another.

In a one hundred and thirty ninth aspect, a sensor system according to any one of the one hundred and thirty third through one hundred and thirty eighth aspects, wherein the sensor device further comprises an array of force sensors disposed on at least one of an inner surface of the inflatable diaphragm and an outer surface of the inflatable diaphragm, wherein the array of force sensors provides one or more signals indicative of a location of contact between an object and the inflatable diaphragm.

In a one hundred and fortieth aspect, a sensor system according to any one of the one hundred and thirty third three one hundred and thirty ninth aspects, wherein the sensor device further includes an outer cover layer disposed around the inflatable diaphragm, wherein the outer cover layer is fabricated from a material having a strength of greater than or equal to 35 cN/dtex.

In a one hundred and forty first aspect, a sensor device includes an inflatable diaphragm operable to be disposed on a member, and an array of force sensors disposed about the inflatable diaphragm, wherein the array of force sensors provides one or more signals indicative of a location of contact between an object and the inflatable diaphragm.

In a one hundred and forty second aspect, a sensor device according to the one hundred and forty first aspect, wherein the array of force sensors are operable to be disposed on a surface of the member such that the array of force sensors contacts the inner surface of the inflatable diaphragm.

Anyone hundred and forty third aspect, a sensor device according to the one hundred and forty first aspect or the one hundred and forty second aspect, further including a sensor housing, wherein the array of force sensors is disposed within the sensor housing.

In a one hundred and forty fourth aspect, a sensor device according to any one of the one hundred and forty first through one hundred and forty third aspects, wherein the array of force sensors includes a plurality of linear force resistors.

In a one hundred and forty fifth aspect, a sensor device according to the one hundred and forty fourth aspect, wherein each linear force resistor includes a carbon-doped linear potentiometer.

In a one hundred and forty sixth aspect, a sensor device according to any one of the one hundred and forty first through one hundred and forty fifth aspects, wherein the array of force sensors includes a plurality of individual force sensors.

In a one hundred and forty seventh aspect, a sensor device according to any one of the one hundred and forty first through one hundred and forty sixth aspects, wherein one or more force sensors of the array of force sensors includes a force concentrator.

In a one hundred and forty eighth aspect, a sensor device according to any one of the one hundred and forty first through one hundred and forty seventh aspects, wherein the inflatable diaphragm further includes a port and the sensor device further includes a pressure sensor and tubing that fluidly couples the port to the pressure sensor.

In a one hundred and forty ninth aspect, a sensor device according to any one of the one hundred and forty first through one hundred and forty eighth aspects, further including an outer cover layer disposed around the inflatable diaphragm, wherein the outer cover layer is fabricated from a material having a strength of greater than or equal to 35 cN/dtex.

In a one hundred and fiftieth aspect, a sensor device according to the one hundred and forty ninth aspect, wherein the outer cover layer further includes one or more additional materials including one or more of an electrically conductive material and a friction material having a coefficient of friction that is greater than a coefficient of friction of the material.

In a one hundred and fifty first aspect, a robot including at least one member and a sensor device including an inflatable diaphragm disposed on the at least one member, and an array of force sensors disposed about the inflatable diaphragm, wherein the array of force sensors provides one or more signals indicative of a location of contact between an object and the inflatable diaphragm.

In a hundred and fifty second aspect, a robot according to the one hundred and fifty first aspect, wherein the array of force sensors are disposed on a surface of the at least one member such that the array of force sensors contacts the inner surface of the inflatable diaphragm.

In a one hundred and fifty third aspect, a robot according to the one hundred and fifty first or the one hundred and fifty second aspect, wherein the sensor device further comprises a sensor housing, wherein the array of force sensors is disposed within the sensor housing.

In a one hundred and fifty fourth aspect, a robot according to any one of the one hundred and fifty first through one hundred and fifty third aspects, wherein the array of force sensors includes a plurality of linear force resistors.

In a one hundred and fifty fifth aspect, a robot according to the one hundred and fifty fourth aspect, wherein each linear force resistor includes a carbon-doped linear potentiometer.

In a one hundred and fifty sixth aspect, a robot according to any one of the one hundred and fifty first through one hundred and fifty fifth aspects, wherein the array of force sensors comprises a plurality of individual force sensors.

In a one hundred and fifty seventh aspect, a robot according to any one of the one hundred and fifty first through one hundred and fifty sixth aspects, wherein one or more force sensors of the array of force sensors includes a force concentrator.

In a one hundred and fifty eighth aspect, a robot according to any one of the one hundred and fifty first through one hundred and fifty seventh aspects, wherein the inflatable diaphragm further includes a port, and the sensor device further includes a pressure sensor and tubing, wherein the tubing fluidly couples the port to the pressure sensor.

In a one hundred and fifty ninth aspect, a robot according to any one of the one hundred and fifty first through one hundred and fifty eighth aspects, further including an outer cover layer disposed around the inflatable diaphragm, wherein the outer cover layer is fabricated from a material having a strength of greater than or equal to 35 cN/dtex.

In a one hundred and sixtieth aspect, a robot according to any one of the one hundred and fifty first through one hundred and fifty ninth aspects, further including one or more compliant members disposed between a surface of the at least one member and the inflatable diaphragm.

In a one hundred and sixty first aspect, a robot includes a rail system, a body structure coupled to the rail system, a first arm coupled to a first side of the body structure, one or more first arm actuators providing the first arm with multiple degrees of freedom, a second arm coupled to a second side of the body structure, one or more second arm actuators providing the second arm with multiple degrees of freedom, and a lift actuator operable to move the body structure along the rail system. The one or more first arm actuators and the one or more second arm actuators are operable to wrap the first arm and the second arm around an object and hold the object against the body structure. The lift actuator is operable to move the body structure such that the object is lifted on the rail system.

In a one hundred and sixty second aspect, a robot according to the one hundred and sixty first aspect, wherein each of the one or more first arm actuators and the one or more second arm actuators includes a shoulder actuator that couples the first arm and the second arm to the body structure, an elbow actuator, and a wrist actuator.

In a one hundred and sixty third aspect, a robot according to the one hundred and sixty first aspect or the one hundred and sixty second aspect, further including a first end effector coupled to the wrist actuator of the one or more first arm actuators and a second end effector coupled to the wrist actuator of the one or more second arm actuators.

In a one hundred and sixty fourth aspect, a robot according to the one hundred and sixty third aspect, wherein the first end effector and the second end effector each comprise a deformable membrane.

In a one hundred and sixty fifth aspect, a robot according to any one of the one hundred and sixty first aspect through one hundred and sixty fourth aspect, wherein the body structure includes one or more force sensors operable to detect a force applied to the body structure.

In a one hundred and sixty sixth aspect, a robot according to the one hundred and sixty fifth aspect, wherein the one or more force sensors includes an array of flexible tactile sensors.

In a one hundred and sixty seventh aspect, a robot according to the one hundred and sixty sixth aspect, wherein each force sensor of the array of flexible tactile sensors is operable to detect a force magnitude and a force direction.

In a one hundred and sixty eighth aspect, a robot according to the one hundred and sixty seventh aspect, wherein each flexible tactile sensor includes a pliable layer.

In a one hundred and sixty ninth aspect, a robot according to the one hundred and sixty seventh aspect, further including a processor, wherein the processor is operable to receive one or more signals from the array of force sensors and, from the one or more signals, determine a geometry of the object.

In a one hundred and seventieth aspect, a robot according to the one hundred and sixty fifth aspect, further including a friction material that covers the one or more force sensors.

In a one hundred and seventy first aspect, a robot according to any one of the one hundred and sixty first through one hundred and seventieth aspects, further including one or more deformable sensors positioned on at least one of the first arm and the second arm.

In a one hundred and seventy second aspect, a robot according to the one hundred and seventy first aspect, wherein the one or more deformable sensors includes a deformable membrane.

In a one hundred and seventy third aspects, a robot according to any one of the one hundred and sixty first through one hundred and seventy second aspects, further including one or more control members operable to be grasped by a user such that the user may move the robot.

In a one hundred and seventy fourth aspect, a robot including a rail system, a body structure coupled to the rail system, the body structure including one or more force sensors operable to detect a force applied to the body structure, a first arm coupled to a first side of the body structure, a plurality of first arm actuators providing the first arm with multiple degrees of freedom, a second arm coupled to a second side of the body structure, a plurality of second arm actuators providing the second arm with multiple degrees of freedom, and a lift actuator operable to move the body structure along the rail system. The plurality of first arm actuators and the plurality of second arm actuators are operable to wrap the first arm and the second arm around an object and hold the object against the body structure. The lift actuator is operable to move the body structure such that the object is lifted on the rail system.

In a one hundred and seventy fifth aspect, a robot according to the one hundred and seventy fourth aspect, wherein each of the plurality of first arm actuators and the plurality of second arm actuators includes a shoulder actuator that couples the first arm and the second arm to the body structure, an elbow actuator, and a wrist actuator.

In a one hundred and seventy sixth aspect, a robot according to the one hundred and seventy fifth aspect, wherein the one or more force sensors includes an array of flexible tactile sensors.

In a one hundred and seventy seventh aspect, a robot according to the one hundred and seventy sixth aspect, wherein each force sensor of the array of flexible tactile sensors is operable to detect a force magnitude and a force direction.

In a one hundred and seventy eighth aspect, a robot according to the one hundred and seventy seventh aspect, wherein each flexible tactile sensor includes a pliable layer.

In a one hundred and seventy ninth aspect, a robot according to the one hundred and seventy seventh aspect, further including a processor, wherein the processor is operable to receive one or more signals from the array of force sensors and, from the one or more signals, determine a geometry of the object.

In a one hundred and eightieth aspect, a robot according to any one of the one hundred and seventy fourth through one hundred and seventy ninth aspects, further including one or more deformable sensors positioned on at least one of the first arm and the second arm.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A sensor assembly comprising:
   a compliant substrate assembly comprising:
      a base layer; and
      a deformable layer heat-sealed to the base layer such that the base layer and the deformable layer define at least one inflatable chamber;
   a first member proximate to a first edge of the compliant substrate assembly;
   a second member proximate to a second edge of the compliant substrate assembly, wherein the second edge is opposite the first edge; and
   at least one pressure sensor fluidly coupled to the at least one inflatable chamber and operable to produce a signal indicative of a pressure within the at least one inflatable chamber,
   wherein the first member and the second member are rods.

2. The sensor assembly of claim 1, wherein the at least one inflatable chamber is operable to be filled with a gas.

3. The sensor assembly of claim 2, further comprising a tubing that fluidly couples the at least one inflatable chamber to the at least one pressure sensor.

4. The sensor assembly of claim 1, wherein the base layer is fabricated from a first material and the deformable layer is fabricated from a second material that is different from the first material.

5. The sensor assembly of claim 1, wherein the at least one inflatable chamber comprises an array of inflatable chambers heat sealed to the base layer.

6. The sensor assembly of claim 5, wherein the at least one pressure sensor comprises a plurality of pressure sensors fluidly coupled to the array of inflatable chambers.

7. A structure for receiving a compliant substrate assembly, the structure comprising:
   an outer surface;
   a first set of engagement features extending from a first location of the outer surface, wherein the first set of engagement features are configured to receive a first rod of the compliant substrate assembly; and
   a second set of engagement features extending from a second location of the outer surface that is offset from the first location by a distance, wherein the second set of engagement features are configured to receive a second rod of the compliant substrate assembly, wherein the first and second rods are proximate first and second edges of the compliant substrate assembly, respectively.

8. The structure of claim 7, wherein the distance is greater than a length of the compliant substrate assembly as measured from the first rod to the second rod.

9. The structure of claim 7, wherein the first set of engagement features comprises two or more first hooks and the second set of engagement features comprises two or more second hooks.

10. The structure of claim 7, wherein the structure is at least a portion of a robot arm.

11. A sensor assembly comprising:
    a base structure comprising:
       an outer surface;
       a first set of engagement features extending from a first location of the outer surface; and
       a second set of engagement features extending from a second location of the outer surface that is offset from the first location by a distance;
    a compliant substrate assembly comprising:
       a base layer;
       a deformable layer heat-sealed to the base layer such that the base layer and the deformable layer define at least one inflatable chamber;
       a first member proximate to a first edge of the compliant substrate assembly, wherein the first member is held by the first set of engagement features; and
       a second member proximate to a second edge of the compliant substrate assembly, wherein the second edge is opposite the first edge and the second member is held by the second set of engagement features such that the compliant substrate assembly is stretched over at least a portion of the base structure, wherein the first member and the second member are rods; and
    at least one pressure sensor fluidly coupled to the at least one inflatable chamber and operable to produce a signal indicative of a pressure within the at least one inflatable chamber.

12. The sensor assembly of claim 11, wherein the at least one inflatable chamber is operable to be filled with a gas.

13. The sensor assembly of claim 12, further comprising a tubing that fluidly couples the at least one inflatable chamber to the at least one pressure sensor.

14. The sensor assembly of claim 11, wherein the base layer is fabricated from a first material and the deformable layer is fabricated from a second material that is different from the first material.

15. The sensor assembly of claim 11, wherein the at least one inflatable chamber comprises an array of inflatable chamber heat sealed to the base layer.

16. The sensor assembly of claim 15, wherein the at least one pressure sensor comprises a plurality of pressure sensors fluidly coupled to the array of inflatable chambers.

17. The sensor assembly of claim 11, wherein the distance is greater than a length of the compliant substrate assembly as measured from the first member to the second member.

18. The sensor assembly of claim 11, wherein the first set of engagement features comprises two or more first hooks and the second set of engagement features comprises two or more second hooks.

\* \* \* \* \*